United States Patent
Yoshida et al.

(10) Patent No.: US 9,180,868 B2
(45) Date of Patent: Nov. 10, 2015

(54) CONTROL DEVICE

(71) Applicant: AISIN AW CO. LTD., Anjo-shi, Aichi-ken (JP)

(72) Inventors: Takashi Yoshida, Nishio (JP); Yomei Hakumura, Susono (JP); Yoichi Tajima, Anjo (JO); Kohei Tsuda, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/239,985

(22) PCT Filed: Nov. 22, 2012

(86) PCT No.: PCT/JP2012/080296
§ 371 (c)(1),
(2) Date: Feb. 20, 2014

(87) PCT Pub. No.: WO2013/077401
PCT Pub. Date: May 30, 2013

(65) Prior Publication Data
US 2014/0207323 A1 Jul. 24, 2014

(30) Foreign Application Priority Data
Nov. 22, 2011 (JP) .................... 2011-255347

(51) Int. Cl.
*B60W 20/00* (2006.01)
*B60K 6/48* (2007.10)
(Continued)

(52) U.S. Cl.
CPC ............... *B60W 20/108* (2013.01); *B60K 6/48* (2013.01); *B60L 11/14* (2013.01); *B60L 15/20* (2013.01);
(Continued)

(58) Field of Classification Search
CPC ..................... B60W 20/108; Y10S 903/93
USPC ............... 701/22; 903/930; 180/65.265
See application file for complete search history.

(56) References Cited

U.S. PATENT DOCUMENTS

2006/0137921 A1  6/2006  Colvin et al.
2007/0080005 A1  4/2007  Joe
(Continued)

FOREIGN PATENT DOCUMENTS

JP  A-2006-188223  7/2006
JP  A-2007-99141   4/2007
(Continued)

OTHER PUBLICATIONS

International Search Report issued in International Patent Application No. PCT/JP2012/080296 mailed Jan. 15, 2013.

*Primary Examiner* — Yonel Beaulieu
*Assistant Examiner* — Yazan A Soofi
(74) *Attorney, Agent, or Firm* — Oliff PLC

(57) ABSTRACT

A control device that that performs starting control for an internal combustion engine. A first transition control during which a first engagement device is caused to transition from a disengaged state to a slipping engagement state is started after the starting request for the internal combustion engine is made. A rotational speed control in which the rotary electric machine is controlled such that a rotational speed of the rotary electric machine becomes a target rotational speed is started before the first engagement device transitions from the disengaged state to the slipping engagement state. A rotational speed control is terminated and torque control in which the rotary electric machine is controlled after the first engagement device transitions from the disengaged to the slipping engagement state, and the second engagement device is caused to transition from a direct engagement state to a slipping engagement state after the torque control is started.

10 Claims, 14 Drawing Sheets

(51) Int. Cl.
*B60L 11/14* (2006.01)
*B60L 15/20* (2006.01)
*B60W 10/02* (2006.01)
*B60W 10/06* (2006.01)

(52) U.S. Cl.
CPC ............... *B60W 10/02* (2013.01); *B60W 10/06* (2013.01); *B60W 20/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2260/44* (2013.01); *B60L 2270/145* (2013.01); *B60W 2710/081* (2013.01); *Y02T 10/6221* (2013.01); *Y02T 10/642* (2013.01); *Y02T 10/70* (2013.01); *Y02T 10/7077* (2013.01); *Y02T 10/7275* (2013.01); *Y10S 903/93* (2013.01)

(56) References Cited

U.S. PATENT DOCUMENTS

| | | | |
|---|---|---|---|
| 2008/0182722 | A1 | 7/2008 | Colvin et al. |
| 2010/0250037 | A1 | 9/2010 | Yoshida et al. |
| 2012/0078456 | A1* | 3/2012 | Hakumura et al. ............. 701/22 |
| 2012/0245774 | A1* | 9/2012 | Takami et al. ................. 701/22 |
| 2013/0310216 | A1* | 11/2013 | Kamiya et al. ................... 477/5 |
| 2014/0249710 | A1* | 9/2014 | Nakanishi et al. .............. 701/22 |

FOREIGN PATENT DOCUMENTS

| | | |
|---|---|---|
| JP | A-2011-20543 | 2/2011 |
| JP | A-2011-213265 | 10/2011 |
| WO | WO 2010/113559 A1 | 10/2010 |

\* cited by examiner

CONTROL DEVICE

TECHNICAL FIELD

The present invention relates to a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels.

BACKGROUND ART

Technologies described in Patent Document 1 and Patent Document 2 mentioned below are already known as the control device described above. The technologies described in Patent Document 1 and Patent Document 2 are configured to perform starting control for an internal combustion engine in which a first engagement device is caused to transition to a slipping engagement state to raise the rotational speed of the internal combustion engine using a rotational drive force of a rotary electric machine in the case where a starting request for the internal combustion engine is made when the first engagement device is in a disengaged state and a second engagement device is in a direct engagement state.

In order to shorten the starting time for the internal combustion engine, the technology according to Patent Document 1 is configured to start transition of the first engagement device from the disengaged state to the slipping engagement state before the second engagement device is caused to transition from the direct engagement state to a slipping engagement state.

In the technology according to Patent Document 1, in order that torque transferred from the rotary electric machine to the side of wheels is not reduced even if slip torque with a magnitude of the transfer torque capacity of the first engagement device is transferred from the rotary electric machine to the internal combustion engine side when the first engagement device is caused to transition to the slipping engagement state, a target transfer torque capacity for the first engagement device is added to target torque for the rotary electric machine to compensate for a reduction in torque due to the slip torque in a feedforward manner.

In the technology according to Patent Document 1, however, in the case where there is a compensation error for the slip torque of the first engagement device, a torque shock due to the compensation error is transferred to the side of the wheels via the second engagement device which is in the direct engagement state, which may give a driver an uncomfortable feeling.

Meanwhile, the technology according to Patent Document 2 is configured to set a target rotational speed to perform rotational speed control for a rotary electric machine even in the case where a method of starting an internal combustion engine in which a second engagement device is not controlled to a slipping engagement state is selected. Although the technology according to Patent Document 2 does not disclose the details of the configuration for setting a target rotational speed, it is considered that the rotational speed control acts in the direction of reducing a torque shock caused when a first engagement device is caused to transition to a slipping engagement state. In Patent Document 2, however, the first engagement device is caused to transition from the slipping engagement state to a direct engagement state with the second engagement device kept in a direct engagement state, and therefore there is a limit to the extent to which transfer of a torque shock generated when the first engagement device is caused to transition from the slipping engagement state to the direct engagement state to the side of the wheels is suppressed.

Thus, the inventor considered suppressing a torque shock caused when the first engagement device is caused to transition from the slipping engagement state to the direct engagement state by bringing the second engagement device into the slipping engagement state. However, the inventor noticed that if it is attempted to cause the second engagement device to transition to the slipping engagement state while the rotational speed control is performed, a rise in rotational speed of an engagement member of the second engagement device on the rotary electric machine side may be suppressed through the rotational speed control, and that in the case where it is attempted to determine that the second engagement device is brought into the slipping engagement state on the basis of a difference between the rotational speeds of engagement members of the second engagement device, there may be a delay in timing to determine that the second engagement device has been brought into the slipping engagement state which leads to elongate the starting time for the internal combustion engine.

RELATED-ART DOCUMENTS

Patent Documents

Patent Document 1: Japanese Patent Application Publication No. 2007-99141 (JP 2007-99141 A)
Patent Document 2: Japanese Patent Application Publication No. 2011-20543 (JP 2011-20543 A)

SUMMARY OF THE INVENTION

Problem to be Solved by the Invention

Thus, it is desirable to provide a control device that can suppress transfer of a torque shock due to variations in transfer torque capacity of a first engagement device to the side of wheels even in the case where transition of the first engagement device from a disengaged state to a slipping engagement state is started before a second engagement device is caused to transition from a direct engagement state to a slipping engagement state in order to shorten the starting time for an internal combustion engine, and that can suppress elongation of the starting time for the internal combustion engine with a delay in timing to determine that the second engagement device has been brought into the slipping engagement state when the second engagement device is caused to transition from the direct engagement state to the slipping engagement state.

Means for Solving the Problem

The present invention provides a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels, characterized in that in performing starting control for the internal combustion engine in which a rotational speed of the internal combustion engine is raised using a rotational drive force of the rotary electric machine in the case where a starting request for the internal combustion engine is made with the first engagement device in a disengaged state and with the second engagement device in a direct engagement state, first transition control in which the first engagement device is caused to transition from the disengaged state to a slipping engagement state is started after the starting request for the internal combustion engine is made, rotational speed control in which the rotary electric machine is controlled such that a rotational speed of the rotary electric machine becomes a target rotational speed is started before the first engagement device transitions from the disengaged state to the slipping engagement state, the rotational speed control is terminated and torque control in which the rotary electric machine is controlled such that output torque of the rotary electric machine becomes target torque is started after the first engagement device transitions from the disengaged state to the slipping engagement state, and the second engagement device is caused to transition from a direct engagement state to a slipping engagement state after the torque control is started.

The term "rotary electric machine" as used herein refers to any of a motor (electric motor), a generator (electric generator), and a motor generator that functions both as a motor and as a generator as necessary.

The term "drivably coupled" as used herein refers to a state in which two rotary elements are coupled to each other so as to enable transfer of a drive force, which includes a state in which the two rotary elements are coupled to each other so as to rotate together with each other, and a state in which the two rotary elements are coupled to each other via one or two or more transmission members so as to enable transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction engagement device and a meshing-type engagement device.

According to the characteristic configuration, the first engagement device can be immediately caused to transition from the disengaged state to the slipping engagement state in the case where a starting request for the internal combustion engine is made, which makes it possible to shorten the time taken to start the internal combustion engine.

In addition, even if a torque shock is transferred from the first engagement device to the rotary electric machine side because of variations in transfer torque capacity of the first engagement device in causing the first engagement device to transition from the disengaged state to the slipping engagement state, the output torque of the rotary electric machine is corrected so as to reduce fluctuations in rotational speed of the rotary electric machine caused by the torque shock because the rotational speed control is executed. Consequently, the output torque of the rotary electric machine is corrected so as to cancel the torque shock, which makes it possible to suppress transfer of the torque shock from the rotary electric machine side to the side of the wheels via the second engagement device which is in the direct engagement state.

Further, in causing the second engagement device to transition from the direct engagement state to the slipping engagement state after the internal combustion engine starts rotating, the rotational speed control for the rotary electric machine can be terminated and the torque control can be started before the second engagement device starts slipping. Thus, it is possible to prevent a delay in transition of the second engagement device to the slipping engagement state with a rise in rotational speed of the rotary electric machine suppressed through the rotational speed control even when the second engagement device starts slipping and the rotational speed starts rising. Hence, it is possible to suppress elongation of the starting time for the internal combustion engine due to a delay in timing to determine that the second engagement device has been brought into the slipping engagement state. Moreover, it is possible to prevent a reduction in torque transferred to the side of the wheels with the output torque of the rotary electric machine erroneously corrected by maintaining the rotational speed control.

The first engagement device may be caused to transition from the slipping engagement state to a direct engagement state after the second engagement device transitions from the direct engagement state to the slipping engagement state.

When the second engagement device is brought into the slipping engagement state, torque transferred from the second engagement device to the side of the wheels becomes slip torque with a magnitude of the transfer torque capacity of the second engagement device. Hence, according to the configuration described above, even if a torque shock is transferred from the first engagement device to the rotary electric machine side when the first engagement device is caused to transition from the slipping engagement state to the direct engagement state, the torque shock can be prevented from being transferred from the rotary electric machine side to the wheels via the second engagement device.

Second transition control in which the second engagement device is caused to transition from the direct engagement state to the slipping engagement state may be started after the torque control is started.

According to the configuration, the second engagement device can be easily caused to transition from the direct engagement state to the slipping engagement state after the torque control is started.

The disengaged state of the first engagement device may be a state in which the first engagement device is not producing a transfer torque capacity; the slipping engagement state of the first engagement device may be a state in which there is a difference between the rotational speed of the internal combustion engine and the rotational speed of the rotary electric machine with the first engagement device producing a transfer torque capacity; the direct engagement state of the first engagement device may be a state in which there is no difference between the rotational speed of the internal combustion engine and the rotational speed of the rotary electric machine with the first engagement device producing a transfer torque capacity; the slipping engagement state of the second engagement device may be a state in which there is a difference between rotational speeds of two engagement members of the second engagement device with the second engagement device producing a transfer torque capacity: and the direct engagement state of the second engagement device may be a state in which there is no difference between the rotational speeds of the two engagement members of the second engagement device with the second engagement device producing a transfer torque capacity.

According to the configuration, the state of engagement of the first engagement device and the second engagement device can be appropriately controlled.

The first transition control may be started by providing the first engagement device with a command to produce a transfer torque capacity; and the second transition control in which the second engagement device is caused to transition from the direct engagement state to the slipping engagement state may be started by providing a command to gradually reduce the transfer torque capacity produced by the second engagement device until there is a difference between the rotational speeds of the two engagement members of the second engagement device.

According to the configuration, the first engagement device can be caused to produce a transfer torque capacity after the first transition control is started, and the transfer torque capacity produced by the second engagement device can be reduced until there is a difference between the rotational speeds of the engagement members of the second engagement device after the second transition control is started.

After the second engagement device transitions from the direct engagement state to the slipping engagement state, the torque control may be terminated, and slipping rotational speed control in which the output torque of the rotary electric machine is controlled so as to bring the rotational speed of the rotary electric machine closer to the target rotational speed which is higher than the rotational speed of the rotary electric machine for a case where the second engagement device is in the direct engagement state may be started.

According to the configuration, even if a torque shock is transferred from the first engagement device to the rotary electric machine side in causing the first engagement device to transition from the slipping engagement state to the direct engagement state, the rotational speed of the rotary electric machine can be maintained around the target rotational speed for the slipping rotational speed control, and the second engagement device can be maintained in the slipping engagement state. Hence, it is possible to reliably prevent transfer of the torque shock to the side of the wheels.

The second transition control in which the second engagement device is caused to transition from the direct engagement state to the slipping engagement state may be started after transfer torque information that is information indicating that the transfer torque capacity of the first engagement device has become equal to or more than a predetermined value is detected.

After the transfer torque information which is information indicating that the transfer torque capacity of the first engagement device has become equal to or more than a predetermined value is detected, the rate of variation in transfer torque capacity of the first engagement device has been reduced, and therefore the possibility that variations in transfer torque capacity are transferred to the side of the wheels as a torque shock has been reduced. Hence, the possibility that the torque shock is transferred to the side of the wheels is low even if the second transition control in which the second engagement device is caused to transition from the direct engagement state to the slipping engagement state is started and the rotational speed control for the rotary electric machine is terminated and the torque control is started before the second engagement device starts slipping.

Information indicating that the rotational speed of the internal combustion engine has become equal to or more than a predetermined rotational speed may be used as the transfer torque information.

According to the configuration, when the transfer torque capacity of the first engagement device exceeds the absolute value of the friction torque of the internal combustion engine, the rotational speed of the internal combustion engine starts rising. Thus, it can be determined that the transfer torque capacity of the first engagement device has become equal to or more than a predetermined value in the case where the rotational speed of the internal combustion engine has become equal to or more than a predetermined rotational speed.

The rotational speed control may include: estimating transfer path input torque that is torque input to the power transfer path on the basis of variations in rotational speed of the rotary electric machine; estimating external input torque input from the wheels to the power transfer path by subtracting at least the output torque of the rotary electric machine from the transfer path input torque; and calculating the target rotational speed on the basis of the external input torque and vehicle required torque that is torque required to drive the wheels.

According to the configuration, the transfer path input torque input to the power transfer path can be estimated on the basis of variations in rotational speed of the rotary electric machine. An estimated value of the external input torque is computed by subtracting the output torque of the rotary electric machine from the estimated transfer path input torque. Thus, torque input to the power transfer path other than the output torque of the rotary electric machine can be estimated with high accuracy. Therefore, the external input torque input from the wheels to the power transfer path can be estimated with high accuracy.

According to the configuration, in addition, the target rotational speed is calculated on the basis of the estimated value of the external input torque and the vehicle required torque. Thus, the rotational speed control can be performed with fluctuations in rotational speed due to a torque shock, which serves as a disturbance component for the external input torque and the vehicle required torque, treated as a deviation from the target rotational speed. Hence, the output torque of the rotary electric machine can be corrected so as to cancel the torque shock through the rotational speed control.

Moreover, the target rotational speed for the rotary electric machine is calculated on the basis of the estimated external input torque in addition to the vehicle required torque. Thus, a target rotational speed that does not cancel the external input torque can be calculated by having the external input torque, such as running resistance torque and brake torque, reflected in the vehicle required torque. Hence, a vibration component of the rotational speed of the rotary electric machine due to the torque shock can be reduced while maintaining the running state or acceleration and deceleration of the vehicle due to a brake operation or the like.

It may be determined that the second engagement device has transitioned from the direct engagement state to the slipping engagement state on the basis of a fact that the rotational speed difference across the second engagement device has become equal to or more than a predetermined value.

According to the configuration, it is possible to reliably determine that the second engagement device has transitioned to the slipping engagement state.

MODES FOR CARRYING OUT THE INVENTION

Figure 1:
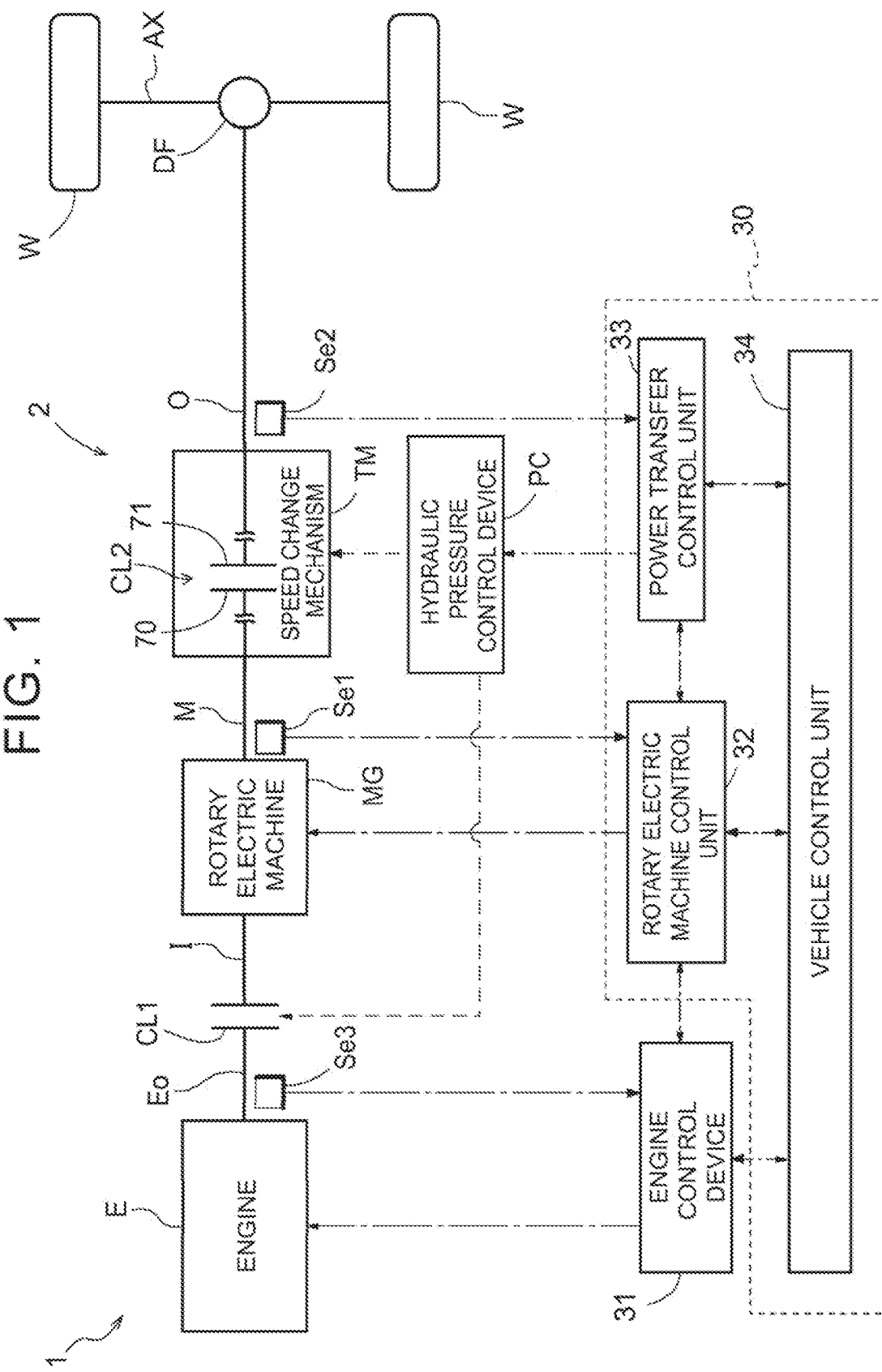
FIG. 1 is a schematic diagram showing a schematic configuration of a vehicle drive device and a control device according to an embodiment of the present invention.

A control device 30 according to an embodiment of the present invention will be described with reference to the drawings. FIG. 1 is a schematic diagram showing a schematic configuration of a vehicle drive device 1 and the control device 30 according to the embodiment. In the drawing, the solid lines each indicate a drive force transfer path, the broken lines each indicate a working oil supply path, and the dash-dotted lines each indicate a signal transfer path. As shown in the drawing, the vehicle drive device 1 according to the embodiment is generally configured to include an engine E and a rotary electric machine MG each serving as a drive force source, and to transfer a drive force of the drive force source to wheels W via a power transfer mechanism. In the vehicle drive device 1, the rotary electric machine MG is provided on a power transfer path 2 that connects between the engine E and the wheels W, a first engagement device CL1 is provided between the engine F and the rotary electric machine MG, and a second engagement device CL2 is provided between the rotary electric machine MG and the wheels W. Here, the first engagement device CL1 selectively couples and decouples the engine E and the rotary electric machine MG to and from each other in accordance with the engagement state of the first engagement device CL1. The second engagement device CL2 selectively couples and decouples the rotary electric machine MG and the wheels W to and from each other in accordance with the engagement state of the second engagement device CL2. In the vehicle drive device 1 according to the embodiment, a speed change mechanism TM is provided on a portion of the power transfer path 2 between the rotary electric machine MG and the wheels W. The second engagement device CL2 is one of a plurality of engagement devices provided in the speed change mechanism TM.

A hybrid vehicle includes the control device 30 which controls the vehicle drive device 1. The control device 30 according to the embodiment includes a rotary electric machine control unit 32 that controls the rotary electric machine MG, a power transfer control unit 33 that controls the speed change mechanism TM, the first engagement device CL1, and the second engagement device CL2, and a vehicle control unit 34 that integrates these control devices to control the vehicle drive device 1. The hybrid vehicle also includes an engine control device 31 that controls the engine E.

Figure 2:
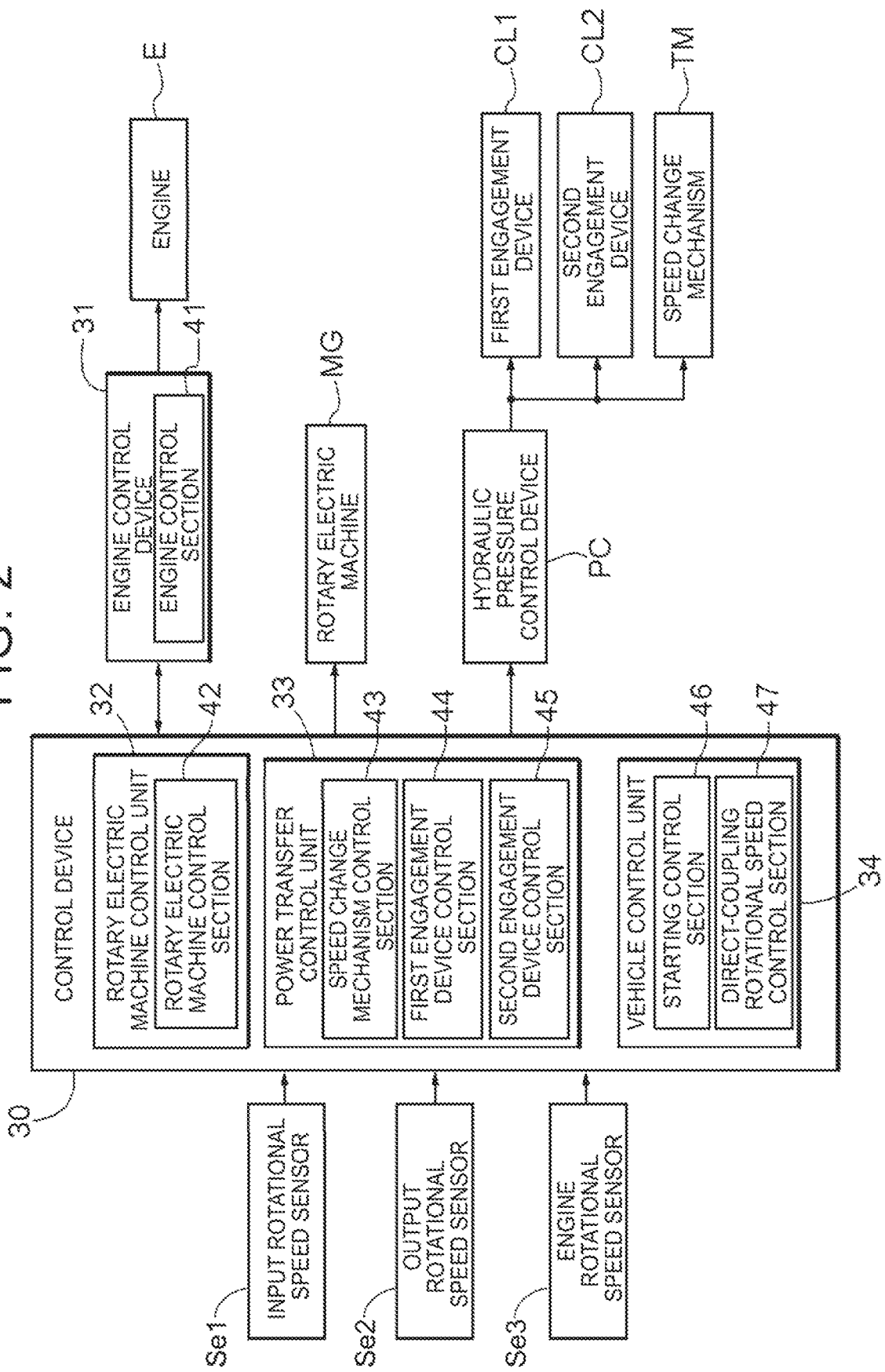
FIG. 2 is a block diagram showing a schematic configuration of the control device according to the embodiment of the present invention.
Figure 3:
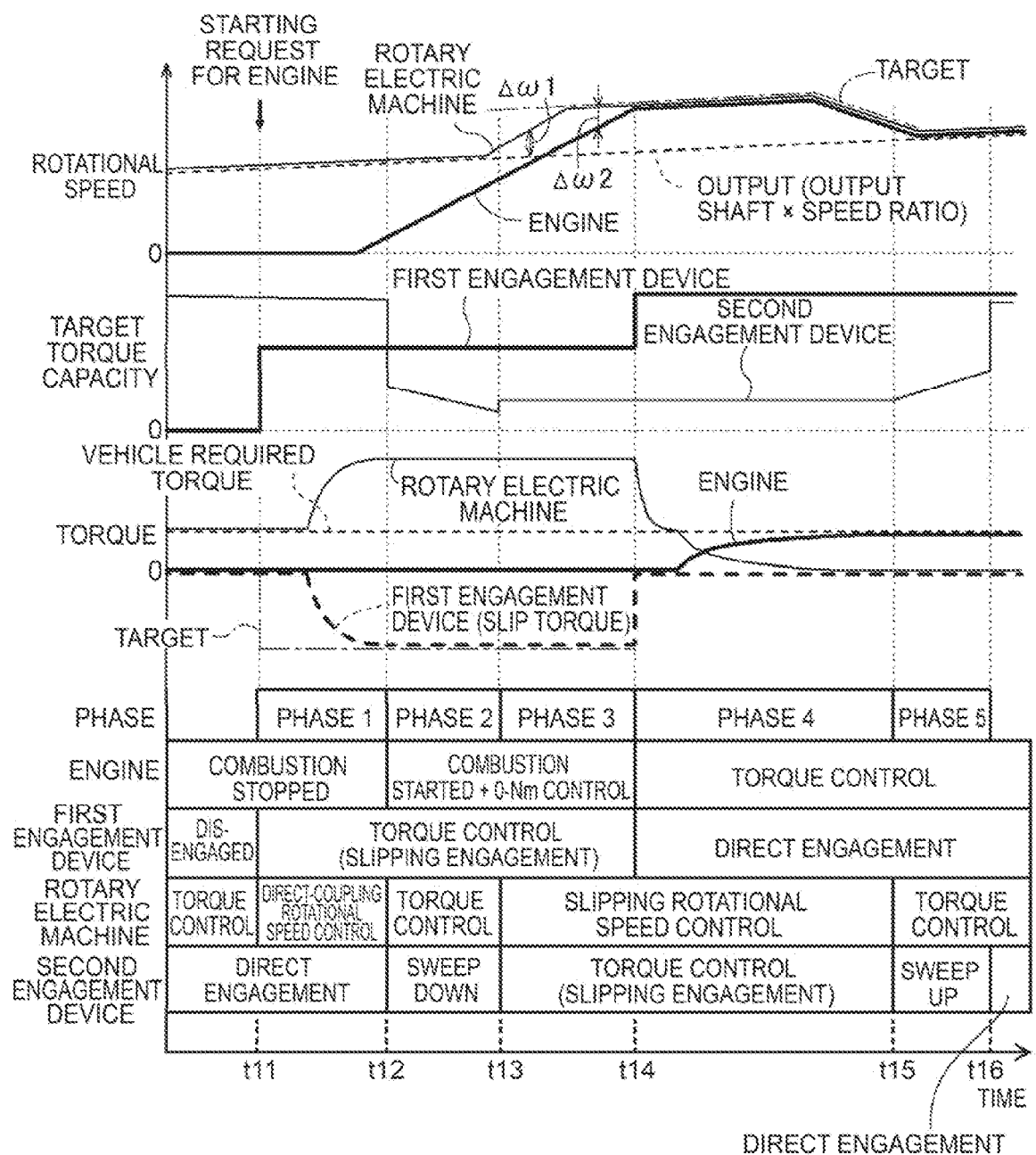
FIG. 3 is a timing chart showing a process of starting control according to the embodiment of the present invention.

As shown in FIGS. 2 and 3, the control device 30 includes a starting control section 46 that performs starting control for the engine E in which the rotational speed of the engine E is raised by a rotational drive force of the rotary electric machine MG in the case where a starting request for the engine E is made with the first engagement device CL1 in the disengaged state and with the second engagement device CL2 in the direct engagement state.

The starting control section 46 starts first transition control in which the first engagement device CL1 is caused to transition from the disengaged state to the slipping engagement state after the starting request for the engine E is made, and starts rotational speed control (hereinafter referred to as "direct-coupling rotational speed control") in which the rotary electric machine MG is controlled such that a rotational speed $\omega m$ of the rotary electric machine MG becomes a target rotational speed (hereinafter referred to as a "direct-coupling target rotational speed") before the first engagement device CL1 transitions from the disengaged state to the slipping engagement state. Then, the starting control section 46 terminates the direct-coupling rotational speed control and starts torque control in which the rotary electric machine MG is controlled such that output torque TM of the rotary electric machine MG becomes target torque after the first engagement device CL1 transitions from the disengaged state to the slipping engagement state, and causes the second engagement device C12 to transition from the direct engagement state to the slipping engagement state after the torque control is started.

The vehicle drive device 1 and the control device 30 according to the embodiment will be described in detail below.

1. Configuration of Vehicle Drive Device 1

First, the configuration of the vehicle drive device 1 of the hybrid vehicle according to the embodiment will be described. As shown in FIG. 1, the hybrid vehicle is a parallel-type hybrid vehicle which includes the engine E and the rotary electric machine MG each serving as a drive force source for the vehicle and in which the engine E and the rotary electric machine MG are drivably coupled to each other in series. The hybrid vehicle includes the speed change mechanism TM, which transfers rotation of the engine E and the rotary electric machine MG transferred to an intermediate shaft M to the output shaft O with the rotational speed $\omega m$ changed and with torque converted.

The engine E is an internal combustion engine driven by combustion of fuel. Various engines known in the art such as a gasoline engine and a diesel engine, for example, may be used as the engine E. In the example, an engine output shaft Eo such as a crankshaft of the engine E is selectively drivably coupled via the first engagement device CL1 to the input shaft I drivably coupled to the rotary electric machine MG. That is, the engine E is selectively drivably coupled to the rotary electric machine MG via the first engagement device CL1 which is a friction engagement element. The engine output shaft Eo is provided with a damper to be able to transfer rotation to the side of the wheels W with fluctuations in output torque and rotational speed due to intermittent combustion of the engine E damped.

The rotary electric machine MG includes a stator fixed to a non-rotary member and a rotor rotatably supported at a position corresponding to the stator. The rotor of the rotary electric machine MG is drivably coupled to the input shaft I and the intermediate shaft M so as to rotate together with the input shaft I and the intermediate shaft M. That is, in the embodiment, both the engine E and the rotary electric machine MG are drivably coupled to the input shaft I and the intermediate shaft M. The rotary electric machine MG is electrically connected to a battery serving as an electricity accumulation device via an inverter that performs a DC/AC conversion. The rotary electric machine MG can function as a motor (electric motor) that is supplied with electric power to produce power and as a generator (electric generator) that is supplied with power to generate electric power. That is, the rotary electric machine MG performs power running using electric power supplied from the battery via the inverter, or generates electric power using a rotational drive force transferred from the engine E or the wheels W. The generated electric power is accumulated in the battery via the inverter.

The speed change mechanism TM is drivably coupled to the intermediate shaft M, to which the drive force source is drivably coupled. In the embodiment, the speed change mechanism TM is a stepped automatic transmission that provides a plurality of shift speeds with different speed ratios. In order to establish the plurality of shift speeds, the speed change mechanism TM includes a gear mechanism such as a planetary gear mechanism and a plurality of engagement devices. In the embodiment, one of the plurality of engagement devices is the second engagement device CL2. The speed change mechanism TM transfers rotation of the intermediate shaft M to the output shaft O with the rotational speed changed with the speed ratio of each shift speed and with torque converted. The torque transferred from the speed change mechanism TM to the output shaft O is distributed and transferred to two, left and right, axles AX via an output differential gear device DF to be transferred to the wheels W drivably coupled to the axles AX. Here, the term "speed ratio" refers to the ratio of the rotational speed of the intermediate shaft M to the rotational speed of the output shaft O for a case where each shift speed is established in the speed change mechanism TM. The speed ratio has a value obtained by dividing the rotational speed of the intermediate shaft M by the rotational speed of the output shaft O. That is, the rotational speed of the output shaft O is obtained by dividing the rotational speed of the intermediate shaft M by the speed ratio. In addition, torque transferred from the speed change mechanism TM to the output shaft O is obtained by multiplying torque transferred from the intermediate shaft M to the speed change mechanism TM by the speed ratio.

In the example, the plurality of engagement devices (including the second engagement device CL2) of the speed change mechanism TM and the first engagement device CL1 are each a friction engagement element such as a clutch and a brake formed to include friction members. Each of the friction engagement elements can be continuously controlled such that the transfer torque capacity of the friction engagement element is increased and decreased by controlling the engagement pressure of the friction engagement element by controlling the supplied hydraulic pressure. A wet multi-plate clutch or a wet multi-plate brake, for example, may be suitably used as the friction engagement elements.

A friction engagement element transfers torque between the engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static friction. Here, the term "transfer torque capacity" refers to the magnitude of maximum torque that can be transferred by a friction engagement element through friction. The magnitude of the transfer torque capacity is varied in proportion to the engagement pressure of the friction engagement element. The term "engagement pressure" refers to a pressure that presses an input-side engagement member (friction plate) and an output-side engagement member (friction plate) against each other. In the embodiment, the engagement pressure is varied in proportion to the magnitude of the supplied hydraulic pressure. That is, in the embodiment, the magnitude of the transfer torque capacity is varied in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to a hydraulic cylinder of the friction engagement element exceeds the reaction force of the spring, the friction engagement element starts producing a transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element is increased in proportion to an increase in supplied hydraulic pressure after the hydraulic pressure exceeds the stroke end pressure. The friction engagement elements may not be provided with a return spring, and may be structured to be controlled in accordance with a difference between the hydraulic pressures applied to both sides of a piston of the hydraulic cylinder.

In the embodiment, the term "engaged state" refers to a state in which a friction engagement element is producing a transfer torque capacity. The engaged state includes a slipping engagement state and a direct engagement state. The term "disengaged state" refers to a state in which a friction engagement element is not producing a transfer torque capacity. The term "slipping engagement state" refers to an engagement state in which there is a difference in rotational speed (slipping) between the engagement members of a friction engagement element. The term "direct engagement state" refers to an engagement state in which there is no difference in rotational speed (slipping) between the engagement members of a friction engagement element. The term "non-direct engagement state" refers to an engagement state other than the direct engagement state, and includes the disengaged state and the slipping engagement state.

In the friction engagement elements, a transfer torque capacity is occasionally produced by dragging by the engagement members (friction members) even in the case where the control device 30 is not producing a command to produce a transfer torque capacity. For example, a transfer torque capacity is occasionally produced by dragging by the friction members which contact each other even in the case where the friction members are pressed against each other by the piston. Thus, the term "disengaged state" also includes a state in which a transfer torque capacity is produced by dragging by the friction members in the case where the control device 30 is not providing a friction engagement device with a command to produce a transfer torque capacity.

In the embodiment, the disengaged state of the first engagement device CL1 indicates a state in which the first engagement device CL1 is not producing a transfer torque capacity. The slipping engagement state of the first engagement device CL1 indicates a state in which the first engagement device CL1 is producing a transfer torque capacity and in which there is a difference between the rotational speed of the engine E and the rotational speed ωm of the rotary electric machine MG. The direct engagement state of the first engagement device CL1 indicates a state in which the first engagement device CL1 is producing a transfer torque capacity and in which there is no difference between the rotational speed of the engine E and the rotational speed ωm of the rotary electric machine MG.

The disengaged state of the second engagement device CL2 indicates a state in which the second engagement device CL2 is not producing a transfer torque capacity. The slipping engagement state of the second engagement device CL2 indicates a state in which the second engagement device C12 is producing a transfer torque capacity and in which there is a difference between the rotational speeds of the two engagement members of the second engagement device CL2. The direct engagement state of the second engagement device CL2 indicates a state in which the second engagement device CL2 is producing a transfer torque capacity and in which there is no difference between the rotational speeds of the two engagement members of the second engagement device CL2. In the case where the second engagement device CL2 is a clutch, the difference between the rotational speeds of the two engagement members corresponds to the difference between the rotational speed of an engagement member 70 of the second engagement device CL2 on the rotary electric machine MG side and the rotational speed of an engagement member 71 on the side of the wheels W. In the case where the second engagement device CL2 is a brake, the difference between the rotational speeds of the two engagement members corresponds to the difference between the rotational speed of an engagement member on the non-rotary member side such as a case (that is, zero) and the rotational speed of an engagement member on the rotary electric machine MG side and the side of the wheels W. In the description of the embodiment, the second engagement device CL2 is a clutch.

2. Configuration of Hydraulic Control System

The hydraulic control system of the vehicle drive device 1 includes a hydraulic pressure control device PC that adjusts the hydraulic pressure of working oil supplied from a hydraulic pump driven by the drive force source for the vehicle or a dedicated motor to a predetermined pressure. Although not described in detail here, the hydraulic pressure control device PC adjusts the operation amount of one or two or more adjustment valves on the basis of a signal pressure from a linear solenoid valve for hydraulic pressure adjustment to adjust the amount of the working oil to be drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the first engagement device CL1 and the second engagement device CL2 at a hydraulic pressure required by the friction engagement element.

3. Configuration of Control Device

Next, the configuration of the control device 30 which controls the vehicle drive device 1 and the engine control device 31 will be described with reference to FIG. 2.

The control units 32 to 34 of the control device 30 and the engine control device 31 each include an arithmetic processing unit such as a CPU serving as a core member, a storage device such as a random access memory (RAM) configured to read and write data from and into the arithmetic processing unit and a read only memory (ROM) configured to read data from the arithmetic processing unit, and so forth. Functional sections 41 to 47 of the control device 30 etc. are formed by software (a program) stored in the ROM of the control device or the like, hardware such as a separately provided arithmetic circuit, or a combination of both. The control units 32 to 34 of the control device 30 and the engine control device 31 are configured to communicate with each other, and perform cooperative control while sharing various information such as information detected by sensors and control parameters, thereby implementing the functions of the functional sections 41 to 47.

The vehicle drive device 1 includes sensors Se1 to Se3 that output an electrical signal to be input to the control device 30 and the engine control device 31. The control device 30 and the engine control device 31 calculate information detected by the sensors on the basis of the input electrical signal.

An input rotational speed sensor Se1 is a sensor that detects the rotational speed of the input shaft I and the intermediate shaft M. The rotor of the rotary electric machine MG is integrally drivably coupled to the input shaft I and the intermediate shaft M. Thus, the rotary electric machine control unit 32 detects the rotational speed (angular speed) ωm of the rotary electric machine MG and the rotational speed of the input shaft I and the intermediate shaft M on the basis of a signal input from the input rotational speed sensor Se1. An output rotational speed sensor Se2 is a sensor that detects the rotational speed of the output shaft O. The power transfer control unit 33 detects the rotational speed (angular speed) of the output shaft O on the basis of a signal input from the output rotational speed sensor Se2. The rotational speed of the output shaft O is proportional to the vehicle speed. Therefore, the power transfer control unit 33 calculates the vehicle speed on the basis of the signal input from the output rotational speed sensor Se2. An engine rotational speed sensor Se3 is a sensor that detects the rotational speed of the engine output shaft Eo (engine E). The engine control device 31 detects the rotational speed (angular speed) of the engine E on the basis of a signal input from the engine rotational speed sensor Se3.

3-1. Engine Control Device 31

The engine control device 31 includes an engine control section 41 that controls an operation of the engine E. In the embodiment, in the case where a command for engine required torque is provided from the vehicle control unit 34, the engine control section 41 performs torque control in which an output torque command value is set to the engine required torque according to the command provided from the vehicle control unit 34, and in which the engine E is controlled so as to output torque corresponding to the output torque command value. In the case where there is an engine combustion start request, the engine control device 31 determines that a command is provided to start combustion of the engine E, and performs control so as to start combustion of the engine E by starting to supply fuel to the engine E and ignite the fuel.

3-2. Power Transfer Control Unit 33

The power transfer control unit 33 includes a speed change mechanism control section 43 that controls the speed change mechanism TM, a first engagement device control section 44 that controls the first engagement device CL, and a second engagement device control section 45 that controls the second engagement device CL2 during starting control for the engine E.

3-2-1. Speed Change Mechanism Control Section 43

The speed change mechanism control section 43 controls establishment of a shift speed in the speed change mechanism TM. The speed change mechanism control section 43 decides a target shift speed for the speed change mechanism TM on the basis of information detected by the sensors such as the vehicle speed, the accelerator operation amount, and the shift position. Then, the speed change mechanism control section 43 controls the hydraulic pressure to be supplied to the plurality of engagement devices provided in the speed change mechanism TM via the hydraulic pressure control device PC to engage or disengage the engagement devices in order to establish the target shift speed in the speed change mechanism TM. Specifically, the speed change mechanism control section 43 provides the hydraulic pressure control device PC with a command for a target hydraulic pressure (command pressure) for the engagement devices, and the hydraulic pressure control device PC supplies the engagement devices with a hydraulic pressure at the target hydraulic pressure (command pressure) according to the command.

3-2-2. First Engagement Device Control Section 44

The first engagement device control section 44 controls the engagement state of the first engagement device CL1. In the embodiment, the first engagement device control section 44 controls the hydraulic pressure to be supplied to the first engagement device CL1 via the hydraulic pressure control device PC such that the transfer torque capacity of the first engagement device CL1 matches a first target torque capacity according to the command provided from the vehicle control unit 34. Specifically, the first engagement device control section 44 provides the hydraulic pressure control device PC with a command for a target hydraulic pressure (command pressure) set on the basis of the first target torque capacity, and the hydraulic pressure control device PC supplies the first engagement device CL1 with a hydraulic pressure at the target hydraulic pressure (command pressure) according to the command.

3-2-3. Second Engagement Device Control Section 45

The second engagement device control section 45 controls the engagement state of the second engagement device CL2 during starting control for the engine E. In the embodiment, the second engagement device control section 45 controls the hydraulic pressure to be supplied to the second engagement device CL2 via the hydraulic pressure control device PC such that the transfer torque capacity of the second engagement device CL2 matches a second target torque capacity according to the command provided from the vehicle control unit 34. Specifically, the second engagement device control section 45 provides the hydraulic pressure control device PC with a command for a target hydraulic pressure (command pressure) set on the basis of the second target torque capacity, and the hydraulic pressure control device PC supplies the second engagement device CL2 with a hydraulic pressure at the target hydraulic pressure (command pressure) according to the command.

In the embodiment, the second engagement device CL2 is one of a plurality of engagement devices or a singular engagement device establishing a shift speed in the speed change mechanism TM. The engagement device of the speed change mechanism TM to be used as the second engagement device CL2 may be changed in accordance with the shift speed being established, or the same engagement device may be used as the second engagement device CL2.

3-3. Rotary Electric Machine Control Unit 32

The rotary electric machine control unit 32 includes a rotary electric machine control section 42 that controls an operation of the rotary electric machine MG. In the embodiment, in the case where a command for rotary electric machine required torque is provided from the vehicle control unit 34, the rotary electric machine control section 42 performs control in which an output torque command value is set to the rotary electric machine required torque Tmo according to the command provided from the vehicle control unit 34, and in which the rotary electric machine MG is controlled so as to output torque at the output torque command value. Specifically, the rotary electric machine control section 42 controls on and off a plurality of switching elements included in the inverter to control the output torque Tm of the rotary electric machine MG.

3-4. Vehicle Control Unit 34

The vehicle control unit 34 includes functional sections that control integration of various torque control performed on the engine E, the rotary electric machine MG, the speed change mechanism TM, the first engagement device CL1, the second engagement device CL2, and so forth, engagement control for the engagement devices, and so forth over the entire vehicle.

The vehicle control unit 34 calculates vehicle required torque Tr, which is torque required to drive the wheels W and which is a target drive force to be transferred from the intermediate shaft M side to the output shaft O side, and decides the drive mode of the engine E and the rotary electric machine MG, in accordance with the accelerator operation amount, the vehicle speed, the charge amount of the battery, and so forth. The vehicle control unit 34 is a functional section that calculates the engine required torque, which is output torque required for the engine E, the rotary electric machine required torque Tmo, which is output torque required for the rotary electric machine MG, the first target torque capacity, which is a transfer torque capacity required for the first engagement device CL1, and the second target torque capacity, which is a transfer torque capacity required for the second engagement device CL2, to provide the calculated values to the other control units 32 and 33 and the engine control device 31 for integration control.

In the embodiment, the vehicle control unit 34 includes the starting control section 46 which performs starting control for the engine E, and a direct-coupling rotational speed control section 47 that performs direct-coupling rotational speed control.

The starting control section 46 and the direct-coupling rotational speed control section 47 will be described in detail below.

3-4-1. Starting Control Section 46

As shown in the time chart of FIG. 3, the starting control section 46 is a functional section that performs starting control for the engine F in which the rotational speed of the engine E is raised by a rotational drive force of the rotary electric machine MG in the case where a starting request for the engine E is made with the first engagement device CL1 in the disengaged state and with the second engagement device CL2 in the direct engagement state.

As described above, the starting control section 46 starts first transition control in which the first engagement device CL1 is caused to transition from the disengaged state to the slipping engagement state after the starting request for the engine E, and starts direct-coupling rotational speed control in which the rotary electric machine MG is controlled such that the rotational speed ωm of the rotary electric machine MG becomes the direct-coupling target rotational speed before the first engagement device CL1 transitions from the disengaged state to the slipping engagement state. Then, the starting control section 46 terminates the direct-coupling rotational speed control and starts torque control in which the rotary electric machine MG is controlled such that output torque TM of the rotary electric machine MG becomes target torque after the first engagement device CL1 transitions from the disengaged state to the slipping engagement state, and causes the second engagement device CL2 to transition from the direct engagement state to the slipping engagement state after the torque control is started.

<Problem of Starting Control>

In varying the state of engagement of the first engagement device CL1 in order to start the engine E, torque transferred from the first engagement device CL1 to the rotary electric machine MG side may be abruptly varied so that a torque shock may be transferred to the wheels W.

Figure 4:
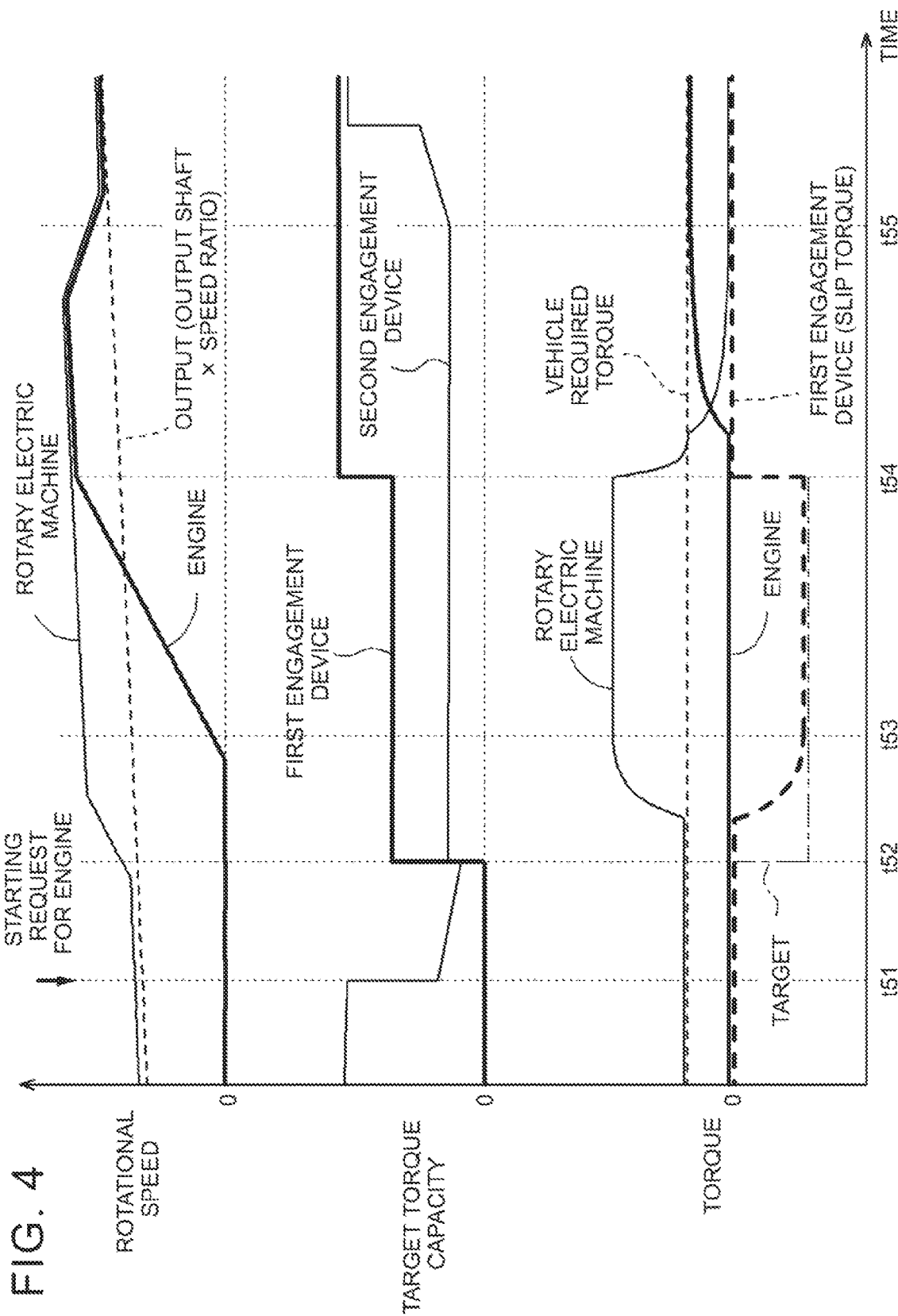
FIG. 4 is a timing chart showing a process of starting control according to the related art.

Therefore, in starting control according to the related art, as shown in the time chart of FIG. 4, the state of engagement of the first engagement device CL1 is varied with the second engagement device CL2, which is disposed between the first engagement device CL1 and the wheels W, caused to transition from the direct engagement state to the slipping engagement state (from time t52 to time t55). When the second engagement device CL2 is brought into the slipping engagement state, torque transferred from the second engagement device CL2 to the side of the wheels W becomes slip torque with a magnitude of the transfer torque capacity of the second engagement device CL2. Hence, even if a torque shock is transferred from the first engagement device CL1 to the rotary electric machine MG side because of variations in state of engagement of the first engagement device CL1, the torque shock can be prevented from being transferred from the rotary electric machine MG side to the wheels W via the second engagement device CL2. In the starting control according to the related art, meanwhile, the first engagement device CL1 is caused to transition from the direct engagement state to the slipping engagement state after the second engagement device CL2 is caused to transition from the direct engagement state to the slipping engagement state (at and after time t52), and it is necessary for the first engagement device CL1 to wait to transition to the slipping engagement state until the second engagement device CL2 is caused to transition to the slipping engagement state. The presence of the waiting time elongates the period since a starting request for the engine E is made until the rotational speed of the engine E starts rising, which elongates the period of the starting control for the engine E.

<Aim of the Invention>

In the starting control according to the present invention, on the other hand, the first engagement device CL1 is caused to transition to the slipping engagement state before the second engagement device CL2 is caused to transition to the slipping engagement state, and there is no waiting time until the second engagement device CL2 is caused to transition to the slipping engagement state unlike the related art. The absence of the waiting time shortens the period since a starting request for the engine E is made until the rotational speed of the engine E starts rising, which makes it possible to shorten the period of the starting control for the engine E.

In the starting control according to the present invention, in addition, even if a torque shock is transferred from the first engagement device CL1 to the rotary electric machine MG side because of variations in transfer torque capacity of the first engagement device CL1, the direct-coupling rotational speed control is executed to control the output torque of the rotary electric machine MG so as to cancel the torque shock, and thus the torque shock is not transferred from the rotary electric machine MG side to the side of the wheels W via the second engagement device CL2 which is in the direct engagement state.

The starting control will be described in detail below with reference to the time chart of FIG. 3.

The starting control section 46 starts a sequence of starting control in the case where a starting request for the engine E is made when conditions for starting the engine E are met such as when the accelerator operation amount is increased or when the charge amount of the battery is reduced with combustion of the engine E stopped and with the rotary electric machine MG rotating (time t11).

In the embodiment, the starting control section 46 is configured to perform sequence control in which the content of control is switched by switching the control phase in accordance with operations and conditions determined in advance.

3-4-1-1. Phase 1

The starting control section 46 starts first transition control in which the first engagement device CL1 is caused to transition from the disengaged state to the slipping engagement state after the starting request for the engine E, and starts direct-coupling rotational speed control in which the rotary electric machine MG is controlled such that the rotational speed cm of the rotary electric machine MG becomes the direct-coupling target rotational speed before the first engagement device CL1 transitions from the disengaged state to the slipping engagement state.

Here, starting the first transition control corresponds to providing a command to cause the first engagement device CL1 to produce a transfer torque capacity.

In the embodiment, in the case where a starting request for the engine E is made (time t11), the starting control section 46 sets the control phase to Phase 1. Then, the starting control section 46 starts direct-coupling rotational speed control for the rotary electric machine MG. The starting control section 46 also starts first transition control in which the first engagement device CL1 is caused to transition from the disengaged state to the slipping engagement state. The engine F is maintained in a state in which combustion of the engine E is stopped, and the second engagement device CL2 is maintained in the direct engagement state.

<Setting of Target Torque Capacity of First Engagement Device CL1>

In the embodiment, in the case where a starting request for the engine E is made (time t11), the starting control section 46 increases the first target torque capacity for the first engagement device CL1 from zero to predetermined starting torque in order to cause the first engagement device CL1 to produce a transfer torque capacity. The starting torque is set to torque that is larger than the absolute value of negative torque of the engine E such as friction torque of the engine E such that the rotational speed of the engine E can be raised.

In the embodiment, the first target torque capacity is increased stepwise from zero. If the first target torque capacity is rapidly increased, the transfer torque capacity of the first engagement device CL1 is also rapidly increased, and therefore a torque shock due to an estimation error of the first transfer torque capacity may also be increased. In the embodiment, however, a torque shock to be transferred to the side of the wheels W through the direct-coupling rotational speed control can be reduced. Put the other way around, since transfer of a torque shock to the side of the wheels W through the direct-coupling rotational speed control can be suppressed, the rate of increase in transfer torque capacity of the first engagement device CL1 can be increased by varying the first target torque capacity stepwise. This quickens transition of the first engagement device CL1 to the slipping engagement state, and shortens the time taken to start the engine E.

<Slip Torque of First Engagement Device CL1>

Figure 5:
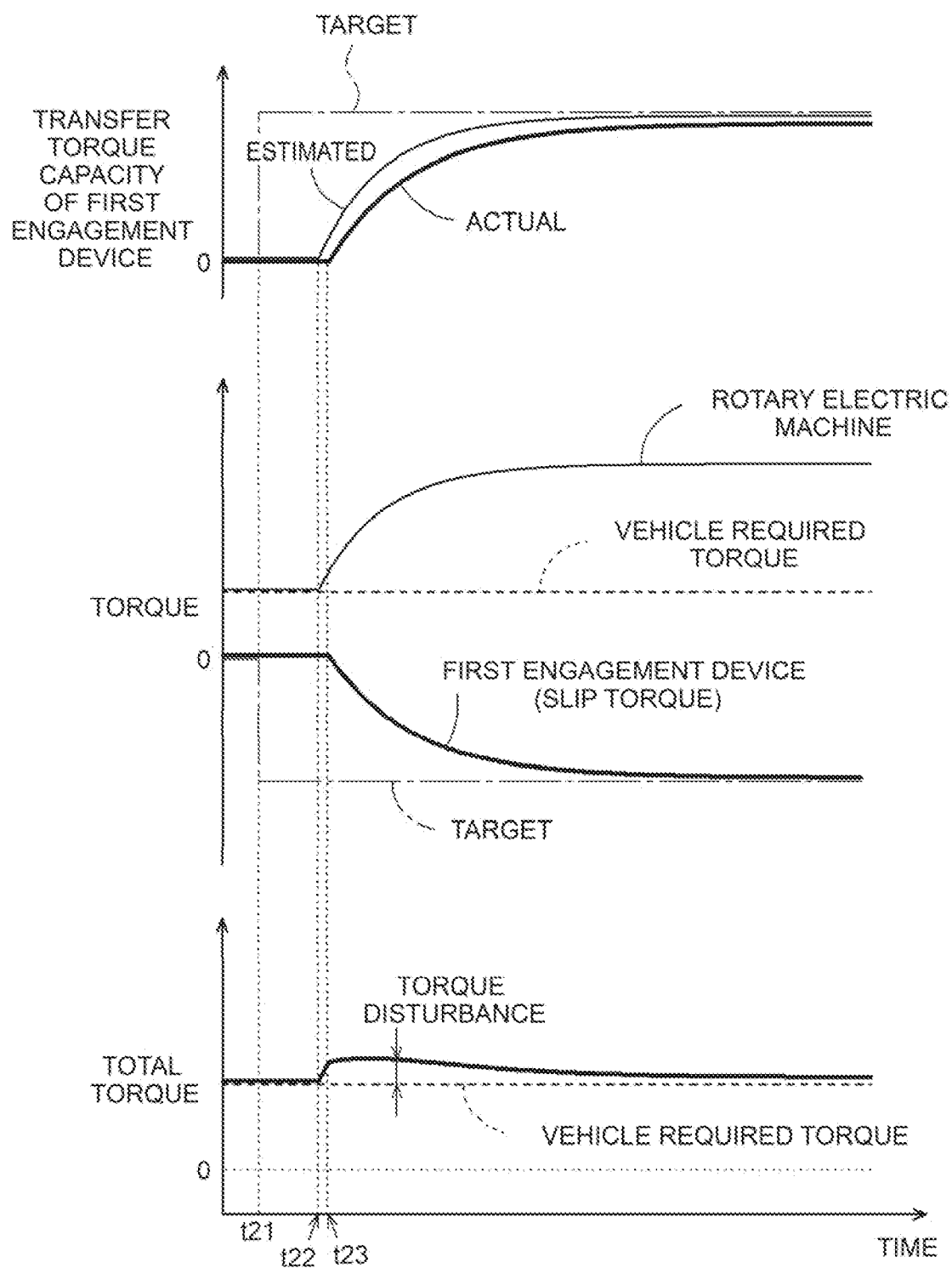
FIG. 5 is a time chart illustrating the control behavior with a first engagement device in a slipping engagement state according to the embodiment of the present invention.

As shown in the example of FIG. 5, the actual transfer torque capacity of the first engagement device CL1 is varied with a response delay with respect to the first target torque capacity. A dead time is caused after the first target torque capacity is increased from zero until the transfer torque capacity starts increasing from zero with a hydraulic cylinder of the first engagement device CL1 filled with oil. After the dead-time delay, the transfer torque capacity is increased with a first-order delay. That is, the response delay characteristics of the transfer torque capacity can be modeled by the dead-time delay and the first-order delay.

The starting control section 46 is configured to estimate the transfer torque capacity (first transfer torque capacity) of the first engagement device CL1 on the basis of the first target torque capacity or the target hydraulic pressure using the response delay characteristics of the transfer torque capacity.

In the embodiment, the starting control section 46 is configured to estimate the transfer torque capacity of the first engagement device CL1 by performing a dead-time delay process and a first-order delay filter process on the first target torque capacity. Here, the dead time and the first-order delay filter coefficient (time constant) are set to values set in advance. Alternatively, the starting control section 46 may be configured to include a transient behavior map in which the relationship between the elapsed time after the first target torque capacity is increased from zero and variations in transfer torque capacity of the first engagement device CL1 is set in advance, and configured to estimate the transfer torque capacity of the first engagement device CL1 on the basis of the elapsed time after the first target torque capacity is increased from zero using the transient behavior map.

Then, the starting control section 46 calculates an estimated value (estimated first slip torque Tfe) of first slip torque T′f transferred from the first engagement device CL1 to the rotary electric machine MG side through kinetic friction on the basis of the estimated first transfer torque capacity. During the starting control, torque is transferred from the rotary electric machine MG side of the first engagement device CL1 to the engine E side, and thus the starting control section 46 sets the estimated first slip torque Tfe to a value obtained by multiplying the estimated first transfer torque capacity by a negative sign (−1).

<Setting of Rotary Electric Machine Required Torque>

During the starting control, torque transferred from the rotary electric machine MG side to the side of the wheels W is decreased by an amount corresponding to the absolute value of the first slip torque. In order to compensate for the decrease by the amount corresponding to the absolute value of the first slip torque in a feedforward manner, the starting control section 46 is configured to set basic rotary electric machine required torque Tb on the basis of the vehicle required torque Tr and the estimated first slip torque Tfe which is an estimated value of transfer torque of the first engagement device CL1. Specifically, the starting control section 46 is configured to set the basic rotary electric machine required torque Tb by adding the absolute value of the estimated first slip torque Tfe to the vehicle required torque Tr.

In the case where an estimation error is caused in the estimated first transfer torque capacity (estimated first slip torque Tfe) as shown in the example of FIG. 5, however, the total torque of the output torque Tm of the rotary electric machine MG and the first slip torque Tf is fluctuated from the vehicle required torque to cause a torque shock. It should be noted, however, that the first slip torque Tf is increased from zero with a first-order delay, and therefore a torque shock has a waveform with a gradual increase, rather than a waveform that is varied stepwise. FIG. 5 shows an example for a case where an estimation error is caused because of errors in setting the dead time, the first-order filter coefficient, and the gain.

In the embodiment, in order to reduce a torque shock to be transferred to the side of the wheels W, the starting control section 46 is configured to calculate the rotary electric machine required torque Tmo by correcting the basic rotary electric machine required torque Tb using a rotation control torque command Tp calculated through the direct-coupling rotational speed control. The direct-coupling rotational speed control will be discussed in detail later.

3-4-1-2. Phase 2

As shown in the example of FIG. 5, as the transfer torque capacity of the first engagement device CL1 becomes closer to the first target torque capacity, the rate of variation in transfer torque capacity is reduced to reduce the rate of variation in total torque. Hence, when the transfer torque capacity of the first engagement device CL1 is increased to a certain degree, the possibility that fluctuations in total torque are transferred to the side of the wheels W as a torque shock is reduced to reduce the necessity of the direct-coupling rotational speed control.

Thus, the starting control section 46 terminates the direct-coupling rotational speed control and starts torque control in which the rotary electric machine MG is controlled such that output torque T′m of the rotary electric machine MG becomes target torque after the first engagement device CL1 transitions from the disengaged state to the slipping engagement state, and causes the second engagement device CL2 to transition from the direct engagement state to the slipping engagement state after the torque control is started.

In the embodiment, the starting control section 46 is configured to start second transition control in which the second engagement device CL2 is caused to transition from the direct engagement state to the slipping engagement state after the torque control is started.

Here, starting the second transition control corresponds to providing a command to cause the second engagement device CL2 to gradually reduce the transfer torque capacity produced by the second engagement device CL2 until there is a difference between the rotational speeds of two engagement members of the second engagement device CL2.

In the embodiment, in addition, the starting control section 46 is configured to determine that the first engagement device CIA has transitioned from the disengaged state to the slipping engagement state in the case where transfer torque information that is information indicating that the transfer torque capacity of the first engagement device CL1 has become equal to or more than a predetermined value is detected, to thereafter terminate the direct-coupling rotational speed control and start the torque control, and to start the second transition control after the torque control is started.

In the embodiment, information indicating that the rotational speed of the engine E has become equal to or more than a predetermined rotational speed is used as the transfer torque information. When the transfer torque capacity of the first engagement device CL1 exceeds the absolute value of the friction torque of the engine E, the rotational speed of the engine E starts rising. Thus, it can be determined that the transfer torque capacity of the first engagement device CL1 has been brought closer to the first target torque capacity in the case where the rotational speed of the engine E has become equal to or more than the predetermined rotational speed. As described above, the starting torque which is set to the first target torque capacity is set to a value that is larger than the absolute value of the friction torque of the engine E. The absolute value of the friction torque of the engine E becomes largest when rotation of the engine F is stopped, and is decreased from that at the time when rotation of the engine E is stopped because of transition from static friction to dynamic friction, formation of an oil film, or the like when the engine E starts rotating. Hence, it can be judged that the transfer torque capacity of the first engagement device CL1 has been brought closer to the target torque capacity when the engine E starts rotating.

Information indicating that the estimated first transfer torque capacity has become equal to or more than a predetermined value may be used as the transfer torque information. Alternatively, information indicating that the elapsed time after the first target torque capacity is increased from zero has become equal to or more than a predetermined value may be used as the transfer torque information. Alternatively, information indicating that the rate of variation in output torque Tm of the rotary electric machine MG has fallen within a predetermined range may be used as the transfer torque information.

In the embodiment, as shown in the example of FIG. 3, in the case where the rotational speed of the engine E has become equal to or more than a predetermined rotational speed (lime t12), the starting control section 46 changes the control phase from Phase 1 to Phase 2. Then, the starting control section 46 terminates the direct-coupling rotational speed control for the rotary electric machine MG, and starts the torque control. In addition, in order to cause the second engagement device CL2 to transition from the direct engagement state to the slipping engagement state, the starting control section 46 starts sweep down in which the second target torque capacity is gradually decreased from a complete engagement capacity. In the embodiment, the second target torque capacity is decreased stepwise from the complete engagement capacity to a predetermined transfer torque capacity at which the second engagement device barely does not transition to the slipping engagement state at the start of the sweep down, and thereafter gradually decreased. Here, the term "complete engagement capacity" refers to a transfer torque capacity at which an engaged state without slipping can be maintained even if torque transferred from the drive force source to the second engagement device CL2 is fluctuated. In addition, the starting control section 46 provides the engine control device 31 with a request to start combustion of the engine E to start combustion of the engine E, and starts 0-Nm control in which the output torque of the engine E is controlled to zero after combustion of the engine E is started. The starting control section 46 maintains the torque control in which the first engagement device CL1 is controlled to the slipping engagement state.

The starting control section 46 may be configured to start combustion of the engine E at any timing when the rotational speed of the engine E is equal to or more than a rotational speed at which combustion can be started and when at least one of the first engagement device CL1 and the second engagement device CL2 is in the slipping engagement state. Also with such a configuration, it is possible to prevent fluctuations in output torque of the engine E caused by the start of combustion of the engine E from being transferred to the side of the wheels W because the first engagement device CL1 or the second engagement device CL2 is in the slipping engagement state.

<Setting of Rotary Electric Machine Required Torque>

The starting control section 46 is configured to set the rotary electric machine required torque on the basis of the vehicle required torque Tr and the estimated first slip torque Tfe which is an estimated value of transfer torque of the first engagement device CL1. Specifically, the starting control section 46 is configured to set the rotary electric machine required torque by adding the absolute value of the estimated first slip torque Tfe to the vehicle required torque Tr.

In the direct-coupling rotational speed control, the rotation control torque command Tp is calculated so as to compensate for the estimation error of the estimated first slip torque Tfe. Thus, in the case where a steady estimation error is caused in the estimated first slip torque Tfe, the rotation control torque command Tp at the time before the direct-coupling rotational speed control is terminated has a value that compensates for the steady estimation error. In the embodiment, the starting control section 46 is configured to hold the value of the rotation control torque command Tp at the time before the direct-coupling rotational speed control is terminated, and to correct the rotary electric machine required torque by adding the held value to the rotary electric machine required torque. That is, the rotary electric machine required torque is set to the total value of the vehicle required torque Tr, the absolute value of the estimated first slip torque Tfe, and the held value of the rotation control torque command Tp at the time before the direct-coupling rotational speed control is terminated.

The held value of the rotation control torque command Tp may be gradually decreased to zero after the torque control is started. Alternatively, the rotary electric machine required torque may not be corrected by adding the held value of the rotation control torque command Tp to the rotary electric machine required torque.

3-4-1-3. Phase 3

When the second target torque capacity is gradually decreased by the sweep down and the transfer torque capacity of the second engagement device CL2 falls below torque being transferred from the rotary electric machine MG side to the second engagement device CL2, the two engagement members of the second engagement device CL2 start slipping with respect to each other, and the rotational speed of the engagement member 70 of the second engagement device CL2 on the rotary electric machine MG side is raised with respect to the rotational speed of the engagement member 71 on the side of the wheels W.

A tier the second engagement device CL2 transitions from the direct engagement state to the slipping engagement state, the starting control section 46 terminates the torque control for the rotary electric machine MG, and starts rotational speed control (hereinafter referred to as "slipping rotational speed control") in which the output torque of the rotary electric machine MG is controlled so as to bring the rotational speed ωm of the rotary electric machine MG closer to a target rotational speed (hereinafter referred to as a "slipping target rotational speed") that is higher than the rotational speed ωm of the rotary electric machine MG for a case where the second engagement device CL2 is in the direct engagement state.

Here, the rotational speed ωm of the rotary electric machine MG for a case where the second engagement device CL2 is in the direct engagement state is the rotational speed ωm of the rotary electric machine MG for a case where it is assumed that the second engagement device CL2 is in the direct engagement state with the rotational speed of the output shaft O at the current rotational speed. In the embodiment, the starting control section 46 is configured to calculate an output rotational speed obtained by multiplying the rotational speed of the output shaft O by a speed ratio Kr of the speed change mechanism TM as the rotational speed ωm of the rotary electric machine MG for a case where the second engagement device CL2 is in the direct engagement state.

In the embodiment, in the case where a rotational speed difference Δω1 between the rotational speed ωm of the rotary electric machine MG and the output rotational speed has become equal to or more than a predetermined rotational speed difference (time t13), it is determined that the second engagement device CL2 has transitioned to the slipping engagement state, and the control phase is changed from Phase 2 to Phase 3.

Then, the starting control section 46 terminates the torque control for the rotary electric machine MG, and starts the slipping rotational speed control in which the output torque of the rotary electric machine MG is controlled such that the rotational speed ωm of the rotary electric machine MG becomes closer to the slipping target rotational speed set by adding a predetermined rotational speed to the output rotational speed. The starting control section 46 terminates the sweep down of the second target torque capacity for the second engagement device CL2, and starts torque control in which the second target torque capacity is set to the vehicle required torque Tr. The starting control section 46 also maintains the 0-Nm control in which the output torque of the engine E is controlled to zero. Further, the starting control section 46 maintains the torque control in which the first engagement device CL1 is controlled to the slipping engagement state.

3-4-1-4. Phase 4

The starting control section 46 is configured to cause the first engagement device CL1 to transition from the slipping engagement state to the direct engagement state after the second engagement device CL2 transitions from the direct engagement state to the slipping engagement state. In the case where a rotational speed difference Δω2 between the rotational speed ωm of the rotary electric machine MG and the rotational speed of the engine E has become equal to or less than a predetermined value (time t14), the starting control section 46 determines that the first engagement device CL1 is brought into the direct engagement state, and changes the control phase from Phase 3 to Phase 4.

Then, the starting control section 46 terminates the torque control for the first engagement device CL1, and increases the first target torque capacity from starting torque to the complete engagement capacity. The term "complete engagement capacity" refers to a transfer torque capacity at which an engaged state without slipping can be maintained even if torque transferred from the drive force source to the first engagement device CL1 is fluctuated. In addition, the starting control section 46 terminates the 0-Nm control for the engine E, and starts torque control in which torque matching the vehicle required torque Tr is output to the engine E. The starting control section 46 gradually decreases the target rotational speed for the rotary electric machine MG to the output rotational speed to reduce the rotational speed ωm of the rotary electric machine MG to the output rotational speed.

3-4-1-5. Phase 5

In the case where the rotational speed difference Δω1 between the rotational speed ωm of the rotary electric machine MG and the output rotational speed has become equal to or less than a predetermined value (time t15), the starting control section 46 determines that the second engagement device CL2 is brought into the direct engagement state, and changes the control phase from Phase 4 to Phase 5.

Then, the starting control section 46 starts sweep up in which the second target torque capacity for the second engagement device CL2 is gradually increased to the complete engagement capacity. In addition, the starting control section 46 terminates the slipping rotational speed control for the rotary electric machine MG, and starts torque control in which the rotary electric machine required torque is set in accordance with the vehicle required torque Tr. Here, the engine required torque and the rotary electric machine required torque are set such that the total of the engine required torque and the rotary electric machine required torque matches the vehicle required torque. Then, in the case where the second target torque capacity is increased to the complete engagement capacity (time t16), the sequence of starting control is terminated.

3-4-1-6. Flowchart of Starting Control

Figure 6:
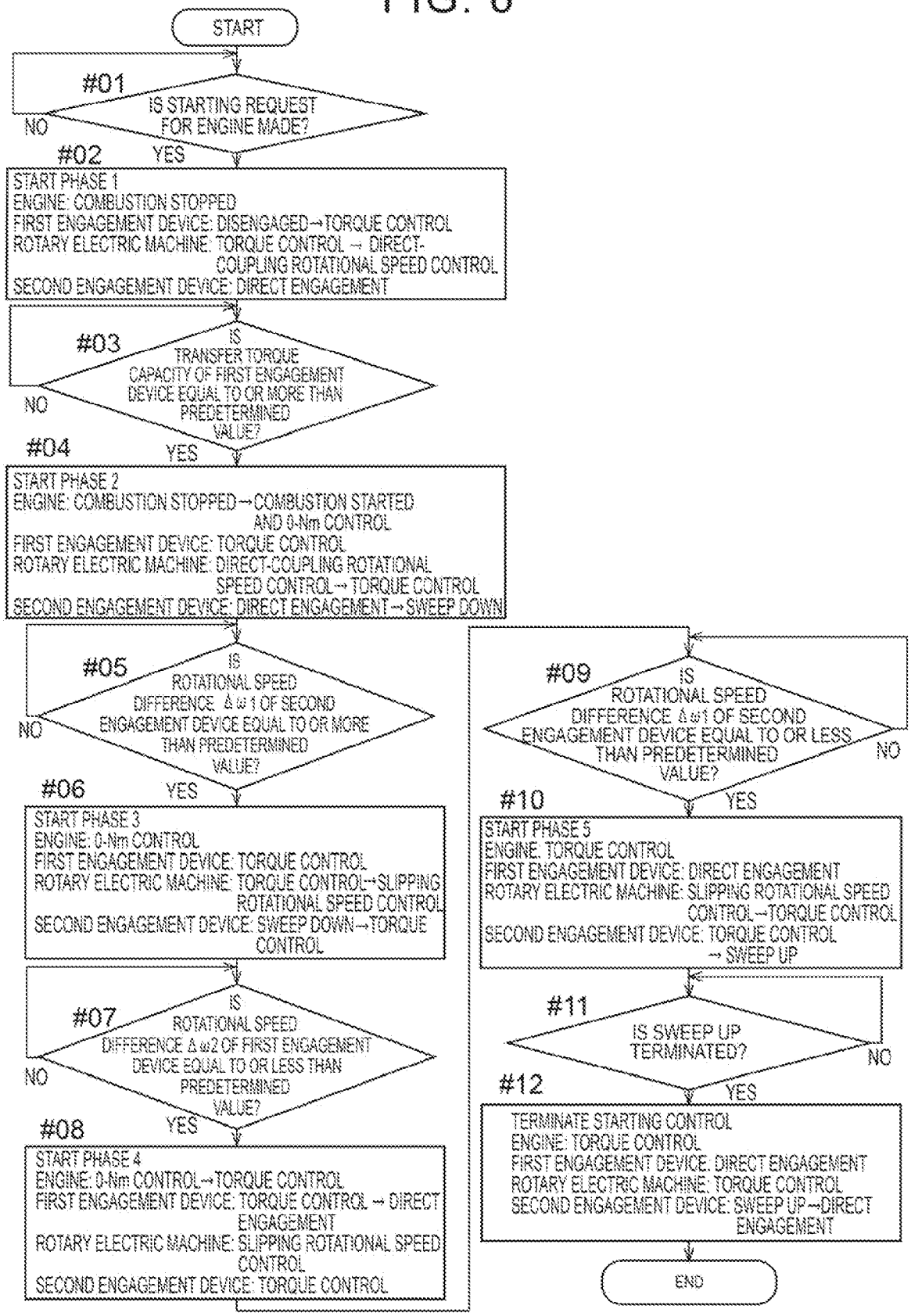
FIG. 6 is a flowchart showing a process performed by the control device according to the embodiment of the present invention.

Next, the process of the starting control will be described with reference to the flowchart of FIG. 6. First, in the case where a starting request for the engine E is made, the starting control section 46 starts a sequence of starting control (step #01: Yes). Then, the starting control section 46 starts control in Phase 1 (step #02). Specifically, the engine E is maintained in a state in which combustion of the engine E is stopped, the torque control is started to cause the first engagement device CL1 to transition from the disengaged state to the slipping engagement state, the direct-coupling rotational speed control for the rotary electric machine MG is started, and the second engagement device CL2 is maintained in the direct engagement state.

Then, in the case where the transfer torque information which is information indicating that the transfer torque capacity of the first engagement device CL1 has become equal to or more than a predetermined value is detected (step #03: Yes), control in Phase 2 is started (step #04). Specifically, combustion of the engine E and the 0-Nm control for the engine E are started, the torque control for the first engagement device CL1 is maintained, the direct-coupling rotational speed control for the rotary electric machine MG is terminated to start the torque control, and sweep down of the second target torque capacity for the second engagement device CL2 in which the transfer torque capacity of the second engagement device CL2 is gradually reduced is started.

Then, in the case where it is determined that the second engagement device CL2 has transitioned to the slipping engagement state with the rotational speed difference Δω1 of the second engagement device CL2 equal to or more than a predetermined value (step #05: Yes), control in Phase 3 is started (step #06). Specifically, the 0-Nm control for the engine E is maintained, the torque control for the first engagement device CL1 is maintained, the torque control for the rotary electric machine MG is terminated to start the slipping rotational speed control, and the sweep down of the second engagement device CL2 is terminated to start the torque control.

Then, in the case where it is determined that the first engagement device CL1 has transitioned to the direct engagement state with the rotational speed difference Δω2 of the first engagement device CL1 equal to or less than a predetermined value (step #07: Yes), control in Phase 4 is started (step #08). Specifically, the 0-Nm control for the engine E is terminated to start the torque control, the torque control for the first engagement device CL1 is terminated to increase the first target torque capacity to the complete engagement capacity, the slipping rotational speed control for the rotary electric machine MG is maintained, and the torque control for the second engagement device CL2 is maintained.

Then, in the case where it is determined that the second engagement device CL2 has transitioned to the direct engagement state with the rotational speed difference Δω1 of the second engagement device CL2 equal to or less than a predetermined value (step #09: Yes), control in Phase 5 is started (step #10). Specifically, the torque control for the engine E is maintained, the direct engagement state of the first engagement device CL1 is maintained, the slipping rotational speed control for the rotary electric machine MG is terminated to start the torque control, and the second target torque capacity for the second engagement device CL2 is increased to the complete engagement capacity.

Then, in the case where the second target torque capacity for the second engagement device CL2 is increased to the complete engagement capacity (step #11: Yes), the sequence of starting control is terminated (step #12).

3-4-2. Direct-coupling Rotational Speed Control Section 47

Next, the direct-coupling rotational speed control executed by the direct-coupling rotational speed control section 47 will be described in detail.

The direct-coupling rotational speed control section 47 is a functional section that controls the rotary electric machine MG such that the rotational speed ωm of the rotary electric machine MG becomes the direct-coupling target rotational speed.

Figure 7:
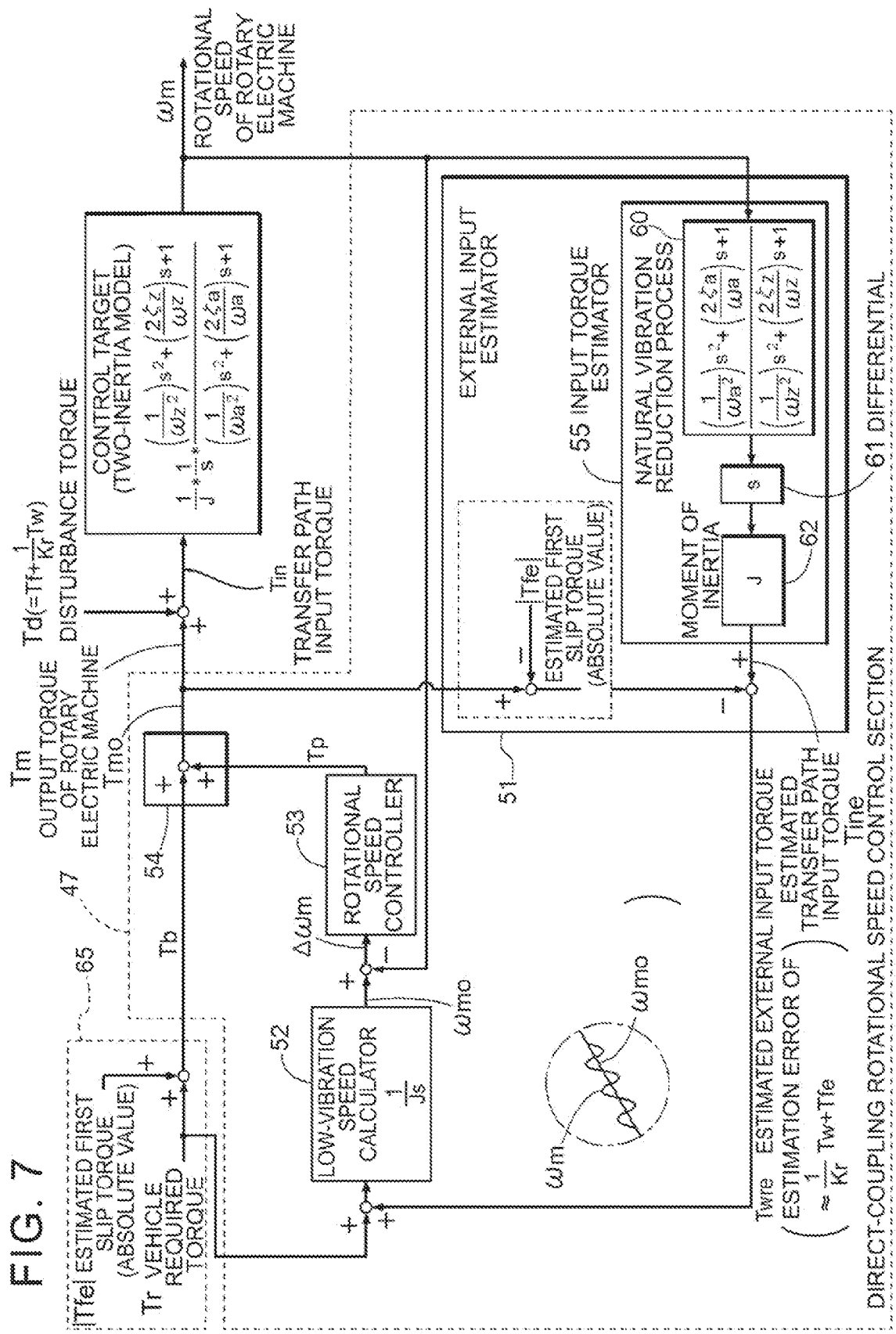
FIG. 7 is a block diagram showing the configuration of a direct-coupling rotational speed control section according to the embodiment of the present invention.

In the embodiment, as shown in FIG. 7, the direct-coupling rotational speed control section 47 includes an external input estimator 51 that estimates transfer path input torque Tine, which is torque input to the power transfer path 2, on the basis of variations in rotational speed ωm of the rotary electric machine MG, and that estimates external input torque Tw, which is input from the wheels W to the power transfer path 2, by subtracting at least the output torque Tm of the rotary electric machine from the estimated transfer path input torque Tine. The direct-coupling rotational speed control section 47 also includes a low-vibration speed calculator 52 that calculates a direct-coupling target rotational speed ωmo on the basis of estimated external input torque Twre and the vehicle required torque Tr which is torque required to drive the wheels W. The direct-coupling rotational speed control section 47 further includes a rotational speed controller 53 that calculates such a rotation control torque command Tp that brings the rotational speed ωm of the rotary electric machine MG closer to the direct-coupling target rotational speed ωmo, and controls the output torque Tm of the rotary electric machine MG using the rotation control torque command Tp.

Figure 8:
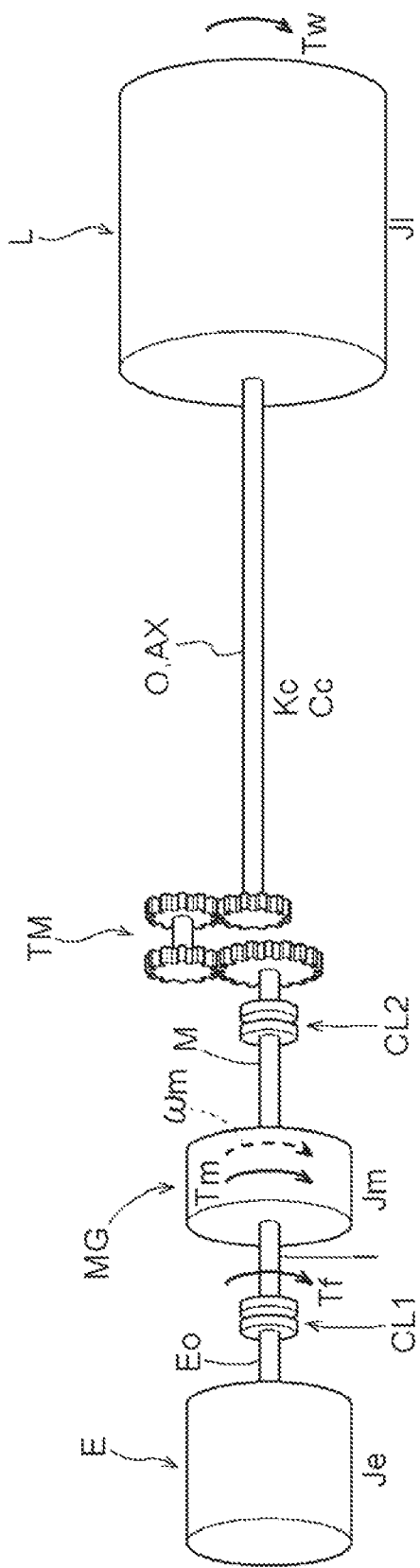
FIG. 8 shows a model of an elastic system of a power transfer path according to the embodiment of the present invention.

3-4-2-1. Modeling of Power Transfer Path 2 into Two-inertia System First, FIG. 8 shows a model of the power transfer path 2 on which the direct-coupling rotational speed control is founded. The power transfer path 2 is modeled into a shaft torsional vibration system. The rotary electric machine MG is drivably coupled to the engine E in the case where the first engagement device CL1 is in the direct engagement state, and drivably coupled to the speed change mechanism TM in the case where the second engagement device CL2 is in the direct engagement state. The speed change mechanism TM is drivably coupled to the vehicle serving as a load L via the output shaft O and the axles AX. The speed change mechanism TM changes the rotational speed between the intermediate shaft M and the output shaft O with the speed ratio Kr, and converts torque. In the following description, the output shaft O and the axles AX are collectively referred to as an "output shaft".

The engine E, the rotary electric machine MG, and the load L (vehicle) are modeled as rigid bodies having moments of inertia Je, Jm, and Jl, respectively. The rigid bodies are drivably coupled to each other through shafts such as the engine output shaft Eo, the input shaft I, the intermediate shaft M, and the output shaft. In the case where the first engagement device CL1 is in the slipping engagement state and the second engagement device CL2 is in the direct engagement state as in Phase I in the starting control, the power transfer path 2 can be modeled into a two-inertia system with the rotary electric machine MG and the load (of the vehicle) as shown in FIG. 9.

Here. Tf is slip torque (first slip torque) transferred from the first engagement device CL1 to the rotary electric machine MG side in the case where the first engagement device CL1 is in the slipping engagement state. Tm is output torque output from the rotary electric machine MG, and ωm is the rotational speed (angular speed) of the rotary electric machine MG. Tw is external input torque such as running resistance torque, such as slope resistance, air resistance, and tire friction resistance, and brake torque input from the wheels W to the power transfer path 2. Kc is the torsional spring constant of the output shaft, and Cc is the viscous friction coefficient of the output shaft.

3-4-2-2. Transfer Function of Two-Inertia Model

Figure 9:
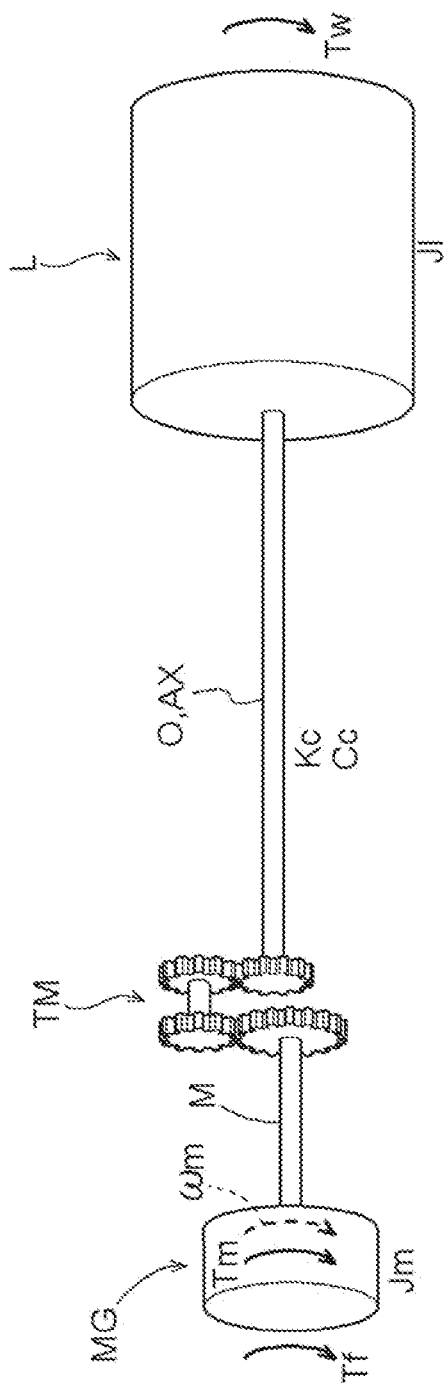
FIG. 9 shows a model of a two-inertia system of the power transfer path according to the embodiment of the present invention.

In the case where the power transfer path 2 is modeled into a two-inertia system shown in FIG. 9, a transfer function P(s) from the output torque Tm of the rotary electric machine MG, the first slip torque Tf, and the external input torque Tw to the rotational speed ωm of the rotary electric machine MG is indicated by the following formula (1):

[Formula 1]

$$\omega m(s) = P(s)Tin(s) \quad (1)$$
$$P(s) = \frac{1}{J}\frac{1}{s}\frac{(1/\omega z^2)s^2 + 2(\zeta z/\omega z)s + 1}{(1/\omega a^2)s^2 + 2(\zeta a/\omega a)s + 1}$$
$$Tin(s) = Tm(s) + Tf(s) + \frac{1}{Kr}Tw(s)$$

Here, Tin is the total value of the output torque Tm of the rotary electric machine MG, the first slip torque Tf, and the external input torque Two input to the power transfer path 2, and the external input torque Tw affects the rotational speed arm of the rotary electric machine MG in a form divided by the speed change mechanism Kr. J is the moment of inertia of the entire power transfer path 2. ωa is the resonance frequency of the power transfer path 2, ζa is the resonance point damping factor, ωz is the anti-resonance frequency of the power transfer path 2, and ζz is the anti-resonance point damping factor. These are represented by the following formula (2) using the torsional spring constant Kc and the viscous friction coefficient Cc of the output shaft, the moment of inertia Jl of the load (vehicle), the moment of inertia Jm of the rotary electric machine MG, and the speed ratio Kr.

The speed ratio Kr is varied in accordance with the shift speed established in the speed change mechanism TM. Hence, the moment of inertia J of the entire power transfer path 2 and the resonance frequency (an are varied in accordance with the speed ratio Kr.

[Formula 2]

$$J = \frac{1}{Kr^2}Jl + Jm \quad (2)$$
$$\omega a = \sqrt{Kc\left(\frac{1}{Jl} + \frac{1}{Kr^2 Jm}\right)} \quad \zeta a = \frac{Cc\omega a}{2Kc}$$
$$\omega z = \sqrt{\frac{Kc}{Jl}} \quad \zeta z = \frac{Cc\omega z}{2Kc}$$

3-4-2-3. External Input Estimator
<Estimation of Transfer Path Input Torque>

As seen from the formula (1), the rotational speed ωm of the rotary electric machine MG is a rotational speed obtained by dividing the transfer path input torque Tin by the moment of inertia J of the entire power transfer path 2, integrating the resulting quotient to derive a rotational speed, and adding the vibration component of the resonance frequency ωa, which is the natural vibration frequency of the power transfer path 2, to the derived rotational speed. Hence, it is found that in estimating the transfer path input torque Tin on the basis of the rotational speed ωm of the rotary electric machine MG, it is necessary to reduce at least the vibration component of the resonance frequency (, of the rotational speed ωm of the rotary electric machine MG. It is also found that the transfer path input torque Tin can be estimated by performing a differential computation process and multiplying the moment of inertia J of the entire power transfer path 2 along with reducing the vibration component.

Hence, as described above, the external input estimator 51 is configured to estimate the transfer path input torque Tine, which is torque input to the power transfer path 2, on the basis of variations in rotational speed ωm of the rotary electric machine MG from which the vibration component of the resonance frequency of the power transfer path 2 has been reduced.

In the embodiment, as shown in FIG. 7, the external input estimator 51 includes an input torque estimator 55 configured to calculate an estimated value Tine of the transfer path input torque Tin by performing at least a natural vibration reduction process 60, which is signal processing for reducing the vibration component of the power transfer path 2, a differential computation process 61, and a process of multiplying the moment of inertia J of the entire power transfer path 2 on the rotational speed ωm of the rotary electric machine MG. The order of the natural vibration reduction process 60, the moment-of-inertia multiplication process 62, and the differential computation process 61 may be changed as desired.

In the example shown in FIG. 7, the input torque estimator 55 is set to perform signal processing set on the basis of 1/P(s), which is the inverse of the transfer function P(s), which corresponds to the characteristics of transfer from the output torque Tm of the rotary electric machine MG to the rotational speed ωm of the rotary electric machine MG shown in the formulas (1) and (2).

In the example, the natural vibration reduction process 60 is set to a transfer function Pr(s) of the following formula (3) on the basis of the inverse of two-inertia vibration characteristics.

[Formula 3]

$$Pr(s) = \frac{(1/\omega a^2)s^2 + 2(\zeta a/\omega a)s + 1}{(1/\omega z^2)s^2 + 2(\zeta z/\omega z)s + 1} \quad (3)$$

Figure 10:
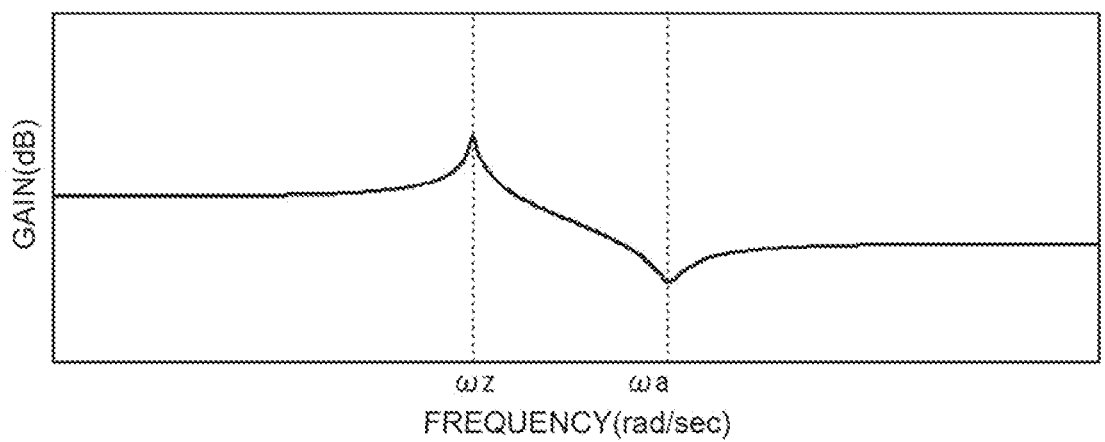
FIG. 10 is a Bode diagram illustrating a process of direct-coupling rotational speed control according to the embodiment of the present invention.

The transfer function Pr(s) of the natural vibration reduction process 60 has frequency characteristics that reduce the vibration component of the power transfer path 2 at the resonance frequency sa as shown in the Bode diagram of FIG. 10.

As indicated by the formula (2), each control constant of the input torque estimator 55 is changed in accordance with the speed ratio Kr which is varied by a change between shift speeds of the speed change mechanism TM.

Alternatively, the natural vibration reduction process 60 may be configured to apply a filtering process for cutting off a frequency band around the resonance frequency ωa of the power transfer path 2. A low-pass filtering process or a band-pass filtering process may be used as the filtering process. Also in this case, the frequency band to be filtered is changed in accordance with the speed ratio Kr.

Alternatively, the vibration characteristics of the power transfer path 2 may be modeled into a higher-order transfer function, and the natural vibration reduction process 60 may be set on the basis of the inverse of the transfer characteristics of the transfer function. The natural vibration reduction process 60 may also be set on the basis of the inverse of transfer characteristics of the power transfer path 2 calculated experimentally.

<Estimation of External Input Torque>

As indicated by the formula (1), the transfer path input torque Tin includes the output torque Tm of the rotary electric machine MG and the first slip torque Tf in addition to the external input torque Tw. Hence, it is found that in estimating the external input torque Tw, which is input from the wheels W to the power transfer path 2, on the basis of the estimated transfer path input torque Tine, it is necessary to subtract at least the output torque Tm of the rotary electric machine MG. It is also found that in the case where the first slip torque Tf is produced with the first engagement device CL1 in the slipping engagement state, it is necessary to further subtract the slip torque Tf in addition to subtracting the output torque Tm of the rotary electric machine MG.

Hence, as described above, the external input estimator 51 is configured to estimate the external input torque Tw by subtracting at least the output torque Tm of the rotary electric machine MG from the estimated transfer path input torque Tine.

In the embodiment, the first engagement device CL1 is in the slipping engagement state during execution of the direct-coupling rotational speed control. Thus, as shown in FIG. 7, the external input estimator 51 is configured to estimate the external input torque Tw by subtracting the output torque Tm of the rotary electric machine MG from the estimated transfer path input torque Tine and adding the absolute value of the estimated first slip torque Tfe. Here, the external input estimator 51 estimates torque (Tw/Kr) obtained by dividing the external input torque Tw by the speed ratio Kr. Hence, the estimated external input torque Twre is an estimated value of Tw/Kr. In the following description, the external input torque Tw/Kr converted to a value on the rotary electric machine MG side is simply referred to as "external input torque Tw".

Here, in the embodiment, the rotary electric machine MG causes a small response delay in torque output with respect to the command value. Therefore, the rotary electric machine required torque Tmo is set as the output torque Tm of the rotary electric machine MG.

During an increase in transfer torque capacity of the first engagement device CL1, an estimation error of the estimated first slip torque Tfe may fluctuate the estimated external input torque Twre from the actual external input torque Tw to cause an estimation error.

Hence, the external input estimator 51 may be configured to hold the estimated external input torque Twre estimated before an increase in transfer torque capacity of the first engagement device CL1 at least during the increase in transfer torque capacity of the first engagement device CL1. This suppresses occurrence of an estimation error of the estimated external input torque Twre.

3-4-2-4. Low-Vibration Speed Calculator

As described above, the low-vibration speed calculator 52 calculates the direct-coupling target rotational speed ωmo on the basis of the estimated external input torque Twre and the vehicle required torque Tr which is torque required to drive the wheels W. The direct-coupling target rotational speed ωmo is a rotational speed obtained by reducing a vibration component of the rotational speed ωn of the rotary electric machine MG. In the embodiment, as shown in FIG. 7, the low-vibration speed calculator 52 is configured to perform a process of dividing torque obtained by adding the estimated external input torque Twre and the vehicle required torque Tr by the moment of inertia J of the entire power transfer path 2 to calculate a rotational acceleration (angular acceleration), and to perform an integral computation process on the rotational acceleration to calculate the direct-coupling target rotational speed ωino.

3-4-2-5. Rotational Speed Controller

As described above, the rotational speed controller 53 calculates such a rotation control torque command Tp that brings the rotational speed ωin of the rotary electric machine MG closer to the direct-coupling target rotational speed ωmo.

In the embodiment, as shown in FIG. 7, the rotational speed controller 53 is configured to calculate the rotation control torque command Tp by performing feedback control on the basis of a rotational speed deviation Δωm obtained by subtracting the rotational speed ωm of the rotary electric machine MG from the direct-coupling target rotational speed ωmo.

Various feedback controllers such as a PID controller and a PI controller may be used as the rotational speed controller 53.

Then, a value calculated by an adder 54 by adding the basic rotary electric machine required torque Tb, which is calculated by adding the absolute value of the estimated first slip torque Tfe to the vehicle required torque Tr, and the rotation control torque command Tp is set as the rotary electric machine required torque Tmo.

The absolute value of the estimated first slip torque Tfe to be added to the vehicle required torque Tr is a feedforward control term for variations in first slip torque Tf, and the rotation control torque command Tp is a feedback control term for variations in first slip torque Tf. The value of the rotation control torque command Tp alone may be set as the rotary electric machine required torque Tmo, rather than adding the basic rotary electric machine required torque Tb.

3-4-2-6. Behavior During Direct-Coupling Rotational Speed Control

Figure 11:
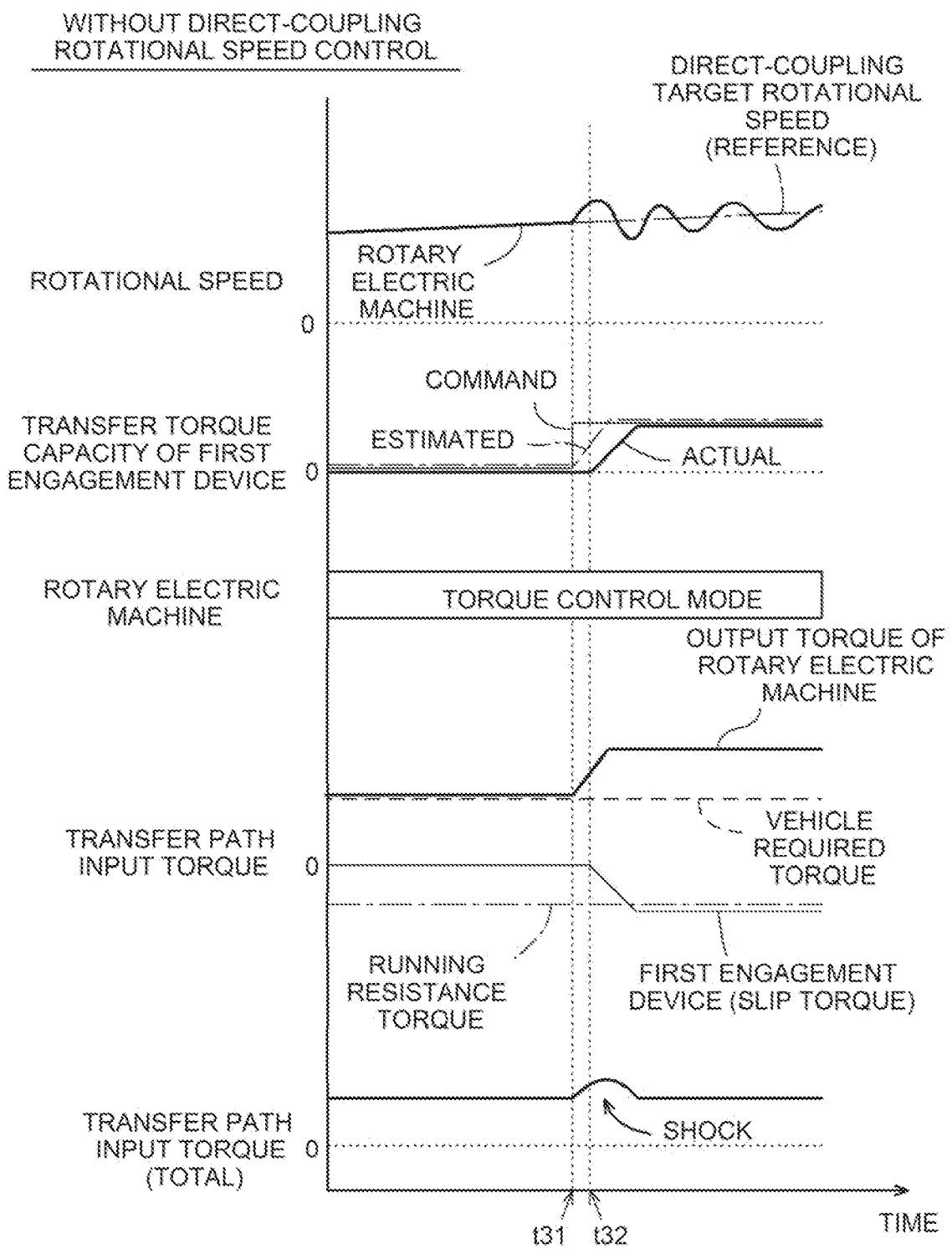
FIG. 11 is a timing chart illustrating a process of direct-coupling rotational speed control according to a comparative example of the present invention.
Figure 12:
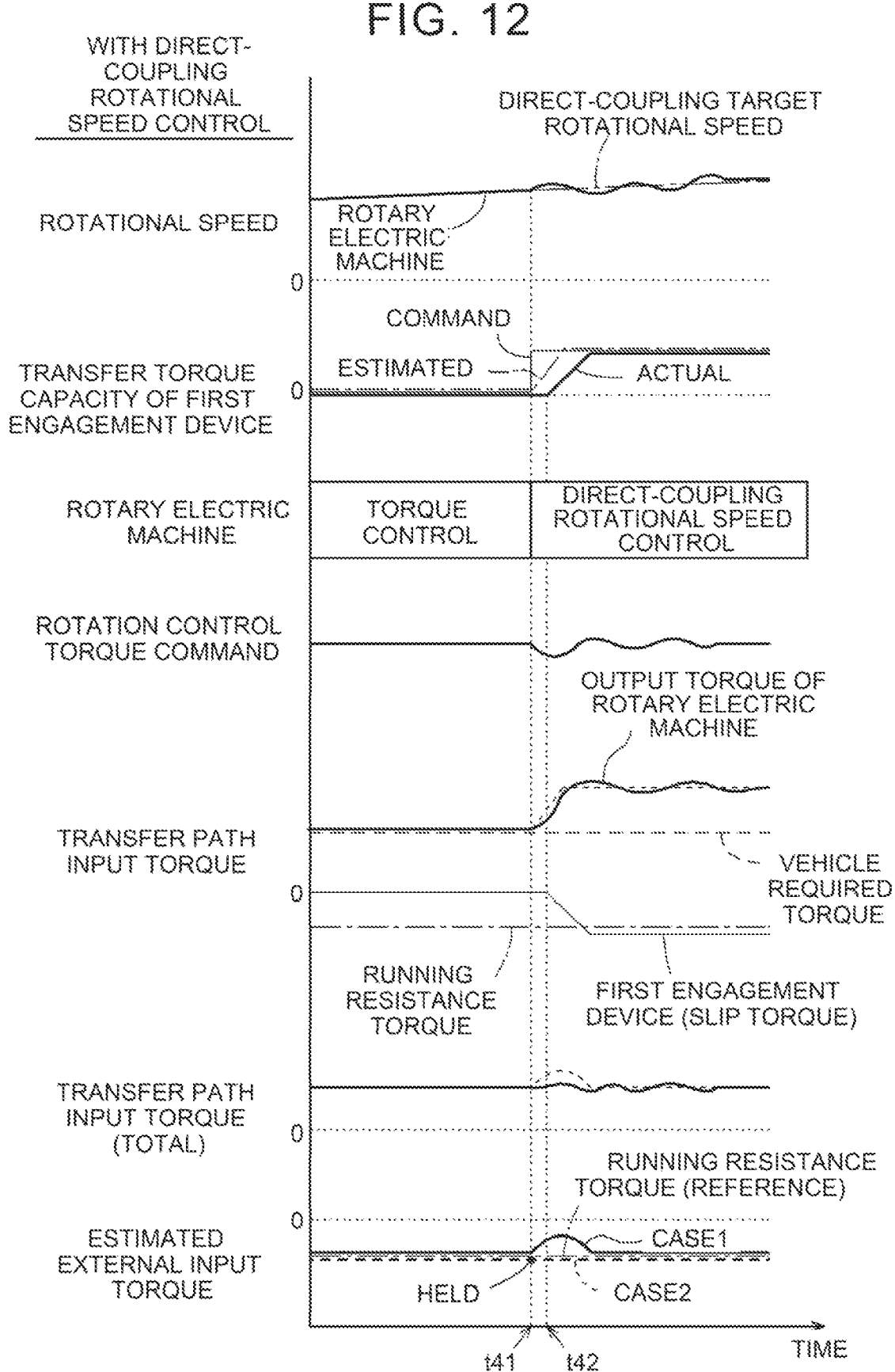
FIG. 12 is a timing chart illustrating a process of the direct-coupling rotational speed control according to the embodiment of the present invention.

Next, the behavior of the direct-coupling rotational speed control performed by the direct-coupling rotational speed control section 47 will be described with reference to the time charts shown in the example of FIGS. 11 and 12. FIG. 11 shows a comparative example for a case where the direct-coupling rotational speed control is not performed, and FIG. 12 shows a case where the direct-coupling rotational speed control is performed.

<Case without Direct-Coupling Rotational Speed Control>

First, the comparative example of FIG. 11 will be described. In the case where a starting request for the engine is made (time t3), the first target torque capacity for the first engagement device CL1 is increased from zero to starting torque. After the first target torque capacity for the first engagement device CL1 is increased, the actual transfer torque capacity is varied with a response delay of the hydraulic pressure supply system. In the example, an error in the phase advance direction with respect to the actual transfer torque capacity is caused in the estimated value of the transfer torque capacity, and an estimation error in the phase advance direction is also caused in the estimated first slip torque Tfe, which is calculated by multiplying the estimated value of the transfer torque capacity by a negative sign.

The estimation error also causes an error in the phase advance direction in variations in basic rotary electric machine required torque Tb, which is calculated by adding the absolute value of the estimated first slip torque Tfe and the vehicle required torque Tr so as to cancel variations in first slip torque Tf. Hence, torque obtained by totaling the output torque Tm of the rotary electric machine MG and the first slip torque Tf is fluctuated from the vehicle required torque Tr at the timing when the transfer torque capacity of the first engagement device CL1 is varied, which causes a torque shock. The torque shock twists the output shaft to fluctuate the rotational speed ωm of the rotary electric machine MG, and excites vibration in the shaft torsional vibration system at the resonance frequency of the shaft torsional vibration system. In the example shown in FIG. 11, the direct-coupling rotational speed control is not performed, and therefore the vibration is damped to a small degree to continue after excitation of the vibration. A direct-coupling target rotational speed ωmo that would be calculated in the case where the direct-coupling rotational speed control were performed is indicated only for reference. It is found that the rotational speed ωm of the rotary electric machine MG vibrates around the direct-coupling target rotational speed ωmo, and that the vibration can be suppressed by performing the direct-coupling rotational speed control.

<Case with Direct-Coupling Rotational Speed Control>

Next, FIG. 12 shows an example according to the embodiment for a case where the direct-coupling rotational speed control is started in the case where a starting request for the engine is made (time 41) under the same drive conditions as those in FIG. 11. The rotation control torque command Tp matching a deviation Δω between the direct-coupling target rotational speed ωmo and the rotational speed ωm of the rotary electric machine MG is calculated through the direct-coupling rotational speed control. This allows the output torque Tm of the rotary electric machine MG to be varied by an amount corresponding to variations in rotation control torque command Tp with respect to the basic rotary electric machine required torque Tb. In addition, the total value of the transfer path input torque Tin is varied by an amount corresponding to variations in rotation control torque command Tp compared to the case of FIG. 11 where the direct-coupling rotational speed control is not performed, which results in a reduced torque shock.

The reduction in torque shock will be described. An estimation error of the estimated first slip torque Tfe causes an estimation error of the estimated external input torque Twre with respect to the actual external input torque (running resistance torque). However, the direct-coupling target rotational speed ωmo is calculated by performing a process of dividing the estimated external input torque Twre by the moment of inertia J of the entire power transfer path 2, and therefore a torque shock caused by the estimation error of the estimated first slip torque Tfe is not likely to manifest itself in the direct-coupling target rotational speed ωmo. On the other hand, the moment of inertia Jm of the rotary electric machine MG is small with respect to the moment of inertia J of the entire power transfer path 2 and is coupled to the load L on the vehicle side by a shaft having elasticity, and therefore the effect of a torque shock caused by the estimation error of the estimated external input torque Twre is likely to manifest itself in the rotational speed ωm of the rotary electric machine MG. Hence, a torque shock can be suppressed by calculating such a rotation control torque command Tp that brings the rotational speed ωm of the rotary electric machine MG closer to the direct-coupling target rotational speed ωmo.

In the example shown in FIG. 12, the vehicle required torque Tr and the external input torque (running resistance torque) are not varied. Even in the case where the vehicle required torque Tr and the external input torque are varied, however, the acceleration of the direct-coupling target rotational speed ωmo can be varied in a feedforward manner in accordance with variations in vehicle required torque Tr and external input torque. This allows the behavior of the direct-coupling target rotational speed ωmo to be varied without delay in accordance with variations in vehicle required torque Tr and external input torque. Hence, a response delay is not caused in the behavior of the rotational speed ωm of the rotary electric machine MG even if the direct-coupling rotational speed control is performed.

In contrast to Case 1 described above, Case 2 corresponds to a case where the estimated external input torque Twre estimated before an increase in transfer torque capacity of the first engagement device CL1 is held during the increase in transfer torque capacity of the first engagement device CL1. In the example of Case 2, the external input estimator 51 is configured to calculate the estimated external input torque Twre also before the direct-coupling rotational speed control is started, and to hold the estimated external input torque Twre at the time when the direct-coupling rotational speed control is started. This suppresses occurrence of an estimation error of the estimated external input torque Twre even in the case where an estimation error is caused in the estimated first slip torque Tfe.

Other Embodiments

Lastly, other embodiments of the present invention will be described. The configuration of each embodiment described below is not limited to its independent application, and may be applied in combination with the configuration of other embodiments unless any contradiction occurs.

Figure 13:
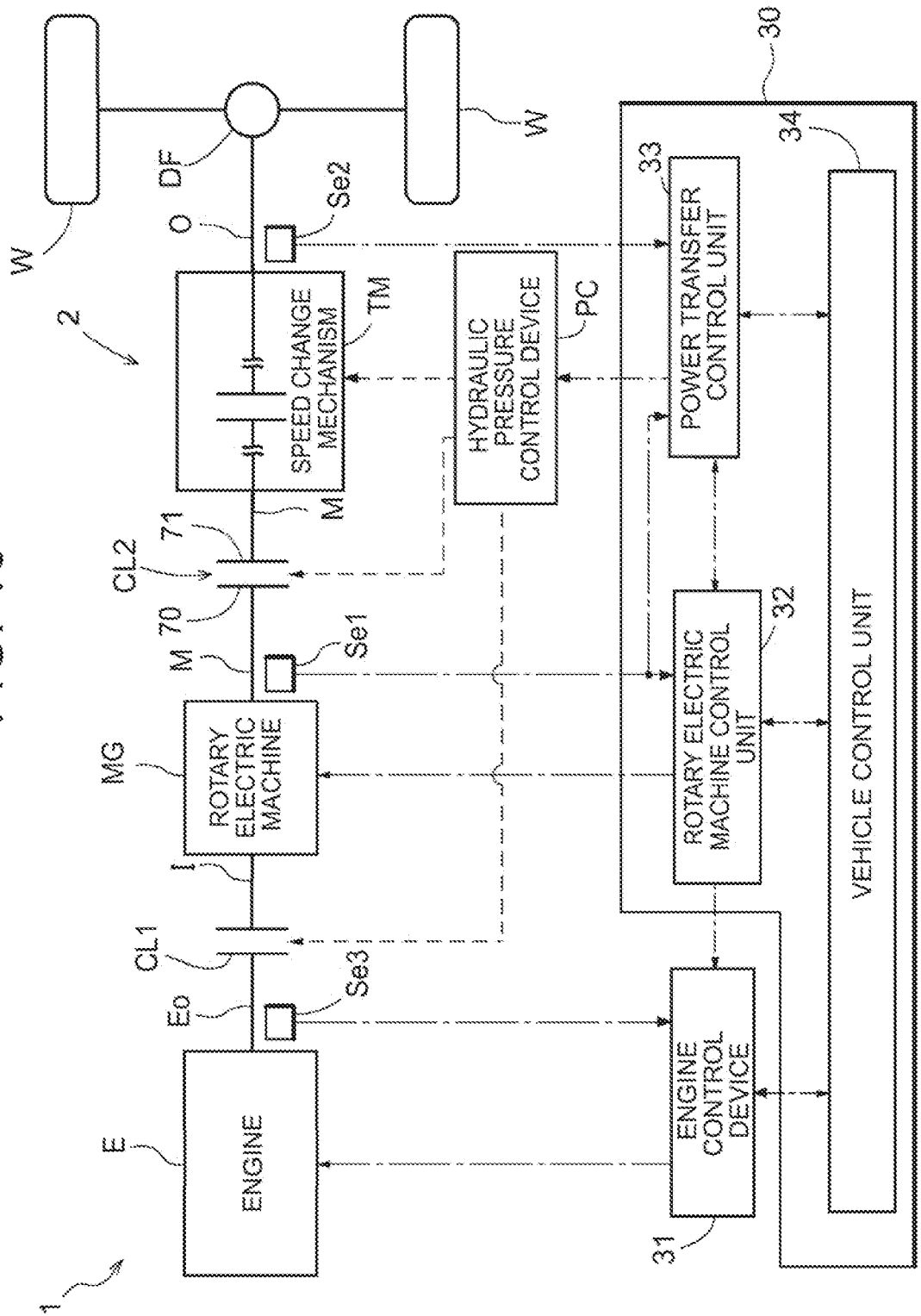
FIG. 13 is a schematic diagram showing a schematic configuration of a vehicle drive device and a control device according to another embodiment of the present invention.

(1) In the embodiment described above, one of the plurality of engagement devices of the speed change mechanism TM is set as the second engagement device CL2, the engagement state of which is controlled during the starting control for the engine E. However, embodiments of the present invention are not limited thereto. That is, as shown in FIG. 13, the vehicle drive device 1 may further include an engagement device provided in a portion of the power transfer path 2 between the rotary electric machine MG and the speed change mechanism TM, and the engagement device may be set as the second engagement device CL2, the state of engagement of which is controlled during the starting control for the engine E. Alternatively, the vehicle drive device 1 may further include an engagement device provided in a portion of the power transfer path 2 between the speed change mechanism TM and the wheels W, and the engagement device may be set as the second engagement device CL2, the state of engagement of which is controlled during the starting control for the engine E. Alternatively, the vehicle drive device 1 shown in FIG. 13 may be configured not to include the speed change mechanism TM.

Figure 14:
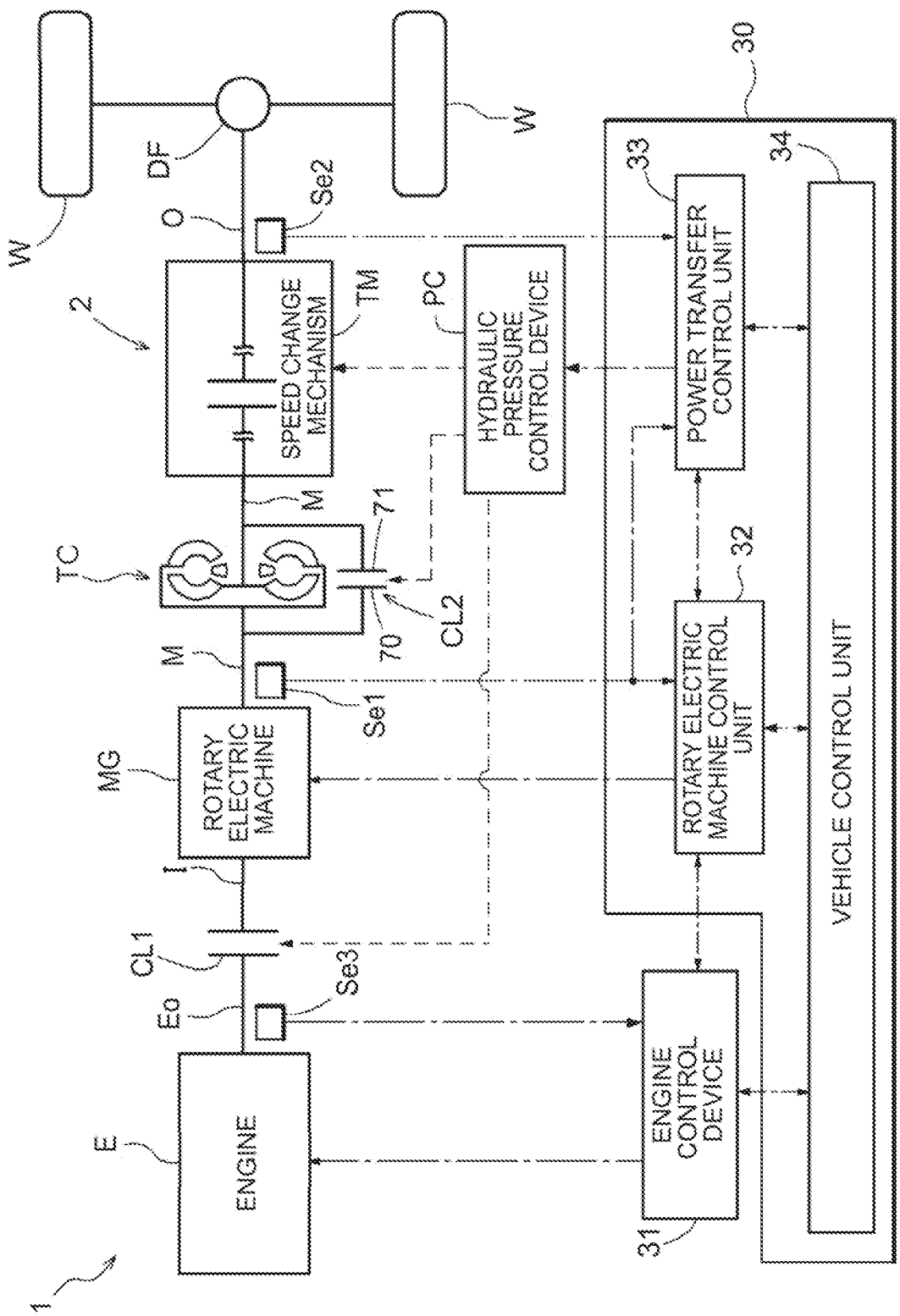
FIG. 14 is a schematic diagram showing a schematic configuration of a vehicle drive device and a control device according to still another embodiment of the present invention.

Alternatively, as shown in FIG. 14, the vehicle drive device 1 may further include a torque converter TC provided in a portion of the power transfer path 2 between the rotary electric machine MG and the speed change mechanism TM, and a lock-up clutch that brings input and output members of the torque converter TC into a direct engagement state may be set as the second engagement device CL2, the state of engagement of which is controlled during the starting control for the engine E.

(2) In the embodiment described above, the first engagement device CL1 and the second engagement device CL2 are each an engagement device that is controlled in accordance with a hydraulic pressure. However, embodiments of the present invention are not limited thereto. That is, one or both of the first engagement device CL1 and the second engagement device CL2 may be an engagement device that is controlled in accordance with a drive force other than a hydraulic pressure such as a drive force of an electromagnet or a drive force of a servomotor, for example.

(3) In the embodiment described above, the speed change mechanism TM is a stepped automatic transmission. However, embodiments of the present invention are not limited thereto. That is, the speed change mechanism TM may be a transmission other than a stepped automatic transmission, such as a continuously variable automatic transmission capable of continuously changing the speed ratio. Also in this case, an engagement device provided in the speed change mechanism TM may be set as the second engagement device CL2, the engagement state of which is controlled during the starting control for the engine E, or an engagement device provided separately from the speed change mechanism TM may be set as the second engagement device CL2.

(4) in the embodiment described above, the control device 30 includes the plurality of control units 32 to 34, and the plurality of control units 32 to 34 include the plurality of functional sections 41 to 47 in a distributed manner. However, embodiments of the present invention are not limited thereto. That is, the control device 30 may include the plurality of control units 32 to 34 discussed above as control devices integrated or separated in any combination. Also, the plurality of functional sections 41 to 47 may be distributed in any combination. For example, in the case where the first engagement device CL1 is one of engagement devices of the speed change mechanism TM, the speed change mechanism control section 43 and the first engagement device control section 44 may be integrated with each other.

(5) In the embodiment described above, in the case where a starting request for the engine E is made, the starting control section 46 starts the direct-coupling rotational speed control for the rotary electric machine MG and the first transition control for the first engagement device CL1 at the same timing. However, embodiments of the present invention are not limited thereto. That is, the starting control section 46 may start the first transition control for the first engagement device CL1 after a starting request for the engine E is made, and may start the direct-coupling rotational speed control for the rotary electric machine MG before the first engagement device CL1 transitions from the disengaged state to the slipping engagement state. Thus, the timing to start the direct-coupling rotational speed control for the rotary electric machine MG and the timing to start the first transition control for the first engagement device CL1 may not coincide with each other after a starting request for the engine E is made. For example, the starting control section 46 may be configured to start the first transition control for the first engagement device CL1 in the case where a starting request for the engine E is made, and to thereafter start the direct-coupling rotational speed control for the rotary electric machine MG.

(6) In the embodiment described above, in the case where it is determined that the rotational speed of the engine E has become equal to or more than a predetermined rotational speed as the transfer torque information, the starting control section 46 starts the second transition control for the second engagement device CL2 and the torque control for the rotary electric machine MG at the same timing. However, embodiments of the present invention are not limited thereto. That is, the starting control section 46 may terminate the direct-coupling rotational speed control and start the torque control for the rotary electric machine MG after the first engagement device CL1 transitions from the disengaged state to the slipping engagement state, and may cause the second engagement device CL2 to transition from the direct engagement state to the slipping engagement state after the torque control is started. Thus, the timing to start the second transition control for the second engagement device CL2 and the timing to start the torque control for the rotary electric machine MG may not coincide with each other after rotation of the engine E is started. For example, the starting control section 46 may be configured to start the second transition control for the second engagement device CL2 in the case where it is determined that the rotational speed of the engine E has become equal to or more than a predetermined rotational speed as the transfer torque information, and to thereafter terminate the direct-coupling rotational speed control and start the torque control for the rotary electric machine MG.

(7) In the embodiment described above, in the case where a starting request for the engine E is made, the starting control section 46 increases the first target torque capacity for the first engagement device CL1 from zero to predetermined starting torque in order to cause the first engagement device CL1 to produce a transfer torque capacity. However, embodiments of the present invention are not limited thereto. That is, after a starting request for the engine E is made, the starting control section 46 may start the first transition control by providing a command to cause the first engagement device CL1 to produce a transfer torque capacity in order to cause the first engagement device CL1 to transition from the disengaged state to the slipping engagement state. For example, the starting control section 46 may be configured to execute control in which a preliminary hydraulic pressure that is so low that the first engagement device CL1 barely produces no transfer torque capacity is supplied in advance before a starting request for the engine E is made in order that the first engagement device CL1 can transition to the slipping state immediately after a starting request for the engine E is made, and to start the first transition control after a starting request for the engine E is made to increase the hydraulic pressure from the preliminary hydraulic pressure to a hydraulic pressure at which a transfer torque capacity is produced. The control in which a preliminary hydraulic pressure that is so low that no transfer torque capacity is barely produced is not included in the first transition control, and the control in which the hydraulic pressure is increased from the preliminary hydraulic pressure to a hydraulic pressure at which a transfer torque capacity is produced is included in the first transition control.

(8) In the embodiment described above, in the case where the rotational speed of the engine E has become equal to or more than a predetermined rotational speed, the starting control section 46 starts sweep down in which the second target torque capacity is gradually decreased from a complete engagement capacity in order to cause the second engagement device CL2 to transition from the direct engagement state to the slipping engagement state. However, embodiments of the present invention are not limited thereto. That is, the starting control section 46 may terminate the direct-coupling rotational speed control and start the torque control after the first engagement device CL1 transitions from the disengaged state to the slipping engagement state, and start the second transition control by providing a command to gradually reduce the transfer torque capacity produced by the second engagement device CL2 to a transfer torque capacity at which there is a difference between the rotational speeds of the engagement members of the second engagement device CL2 in order to cause the second engagement device CL2 to transition from the direct engagement state to the slipping engagement state after the torque control is started. For example, the starting control section 46 may be configured to execute control in which the transfer torque capacity of the second engagement device CL2 is reduced to a preliminary transfer torque capacity at which the second engagement device CL2 barely does not transition to the slipping engagement state in advance before the torque control is started so that a transition can be made to the slipping engagement state immediately after the torque control is started, and to start the second transition control after the torque control is started such that the transfer torque capacity is gradually reduced from the preliminary transfer torque capacity until the second engagement device CL2 is brought into the slipping engagement state. The control in which the transfer torque capacity is reduced to a preliminary transfer torque capacity at which the second engagement device CL2 barely does not transition to the slipping engagement state is not included in the second transition control, and the control in which the transfer torque capacity is gradually reduced from the preliminary transfer torque capacity until the second engagement device CL2 is brought into the slipping engagement state is included in the second transition control.

Industrial Applicability

The present invention may be suitably applied to a control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels.

Description of the Reference Numerals

1 VEHICLE DRIVE DEVICE
2 POWER TRANSFER PATH
30 CONTROL DEVICE
31 ENGINE CONTROL DEVICE
32 ROTARY ELECTRIC MACHINE CONTROL UNIT
33 POWER TRANSFER CONTROL UNIT
34 VEHICLE CONTROL UNIT
41 ENGINE CONTROL SECTION
42 ROTARY ELECTRIC MACHINE CONTROL SECTION
43 SPEED CHANGE MECHANISM CONTROL. SECTION
44 FIRST ENGAGEMENT DEVICE CONTROL SECTION
45 SECOND ENGAGEMENT DEVICE CONTROL SECTION
46 STARTING CONTROL. SECTION
47 DIRECT-COUPLING ROTATIONAL SPEED CONTROL SECTION
51 EXTERNAL INPUT ESTIMATOR
52 LOW-VIBRATION SPEED CALCULATOR
53 ROTATIONAL SPEED CONTROLLER
$\omega m$ ROTATIONAL SPEED OF ROTARY ELECTRIC MACHINE
$\omega mo$ DIRECT-COUPLING TARGET ROTATIONAL SPEED
AX AXLE
CL1 FIRST ENGAGEMENT DEVICE
CL2 SECOND ENGAGEMENT DEVICE
DF OUTPUT DIFFERENTIAL GEAR DEVICE
E ENGINE (INTERNAL COMBUSTION ENGINE)
Eo ENGINE OUTPUT SHAFT
I INPUT SHAFT
J MOMENT OF INERTIA OF ENTIRE POWER TRANSFER PATH
Jl MOMENT OF INERTIA OF LOAD (VEHICLE)

Jm MOMENT OF INERTIA OF ROTARY ELECTRIC MACHINE
Kr SPEED RATIO
L. LOAD (VEHICLE)
M INTERMEDIATE SHAFT
O OUTPUT SHAFT
MG ROTARY ELECTRIC MACHINE
PC HYDRAULIC PRESSURE CONTROL DEVICE
Se1 INPUT ROTATIONAL SPEED SENSOR
Se2 OUTPUT ROTATIONAL. SPEED SENSOR
Se3 ENGINE ROTATIONAL SPEED SENSOR
TM SPEED CHANGE MECHANISM
Tb BASIC ROTARY ELECTRIC MACHINE REQUIRED TORQUE
Tf FIRST SLIP TORQUE
Tfe ESTIMATED FIRST SLIP TORQUE
Tin TRANSFER PATH INPUT TORQUE
Tine ESTIMATED TRANSFER PATH INPUT TORQUE
Tm OUTPUT TORQUE OF ROTARY ELECTRIC MACHINE
Tmo ROTARY ELECTRIC MACHINE REQUIRED TORQUE
Tp ROTATION CONTROL TORQUE COMMAND
Tr VEHICLE REQUIRED TORQUE
Tw EXTERNAL INPUT TORQUE
Twre ESTIMATED EXTERNAL INPUT TORQUE
W WHEEL

The invention claimed is:

1. A control device that controls a vehicle drive device in which a rotary electric machine is provided in a power transfer path that connects between an internal combustion engine and wheels and in which a first engagement device is provided between the internal combustion engine and the rotary electric machine and a second engagement device is provided between the rotary electric machine and the wheels, wherein
in performing starting control for the internal combustion engine in which a rotational speed of the internal combustion engine is raised using a rotational drive force of the rotary electric machine in the case where a starting request for the internal combustion engine is made with the first engagement device in a disengaged state and with the second engagement device in a direct engagement state, a starting control section:
starts first transition control, in which the first engagement device is caused to transition from the disengaged state to a slipping engagement state, after the starting request for the internal combustion engine is made,
starts rotational speed control, in which the rotary electric machine is controlled such that a rotational speed of the rotary electric machine becomes a target rotational speed, before the first engagement device transitions from the disengaged state to the slipping engagement state,
terminates the rotational speed control and starts torque control, in which the rotary electric machine is controlled such that output torque of the rotary electric machine becomes target torque, after the first engagement device transitions from the disengaged state to the slipping engagement state, and
transitions the second engagement device from a direct engagement state to a slipping engagement state after the torque control is started.

2. The control device according to claim 1, wherein
the starting control section transitions the first engagement device from the slipping engagement state to a direct engagement state after the second engagement device transitions from the direct engagement state to the slipping engagement state.

3. The control device according to claim 1, wherein
the starting control section starts second transition control, in which the second engagement device is caused to transition from the direct engagement state to the slipping engagement state, after the torque control is started.

4. The control device according to claim 1, wherein:
the disengaged state of the first engagement device is a state in which the first engagement device is not producing a transfer torque capacity;
the slipping engagement state of the first engagement device is a state in which there is a difference between the rotational speed of the internal combustion engine and the rotational speed of the rotary electric machine with the first engagement device producing a transfer torque capacity;
a direct engagement state of the first engagement device is a state in which there is no difference between the rotational speed of the internal combustion engine and the rotational speed of the rotary electric machine with the first engagement device producing a transfer torque capacity;
the slipping engagement state of the second engagement device is a state in which there is a difference between rotational speeds of two engagement members of the second engagement device with the second engagement device producing a transfer torque capacity; and
the direct engagement state of the second engagement device is a state in which there is no difference between the rotational speeds of the two engagement members of the second engagement device with the second engagement device producing a transfer torque capacity.

5. The control device according to claim 4, wherein:
the starting control section starts the first transition control by providing the first engagement device with a command to produce a transfer torque capacity; and
the starting control section starts a second transition control in which the second engagement device is caused to transition from the direct engagement state to the slipping engagement state, by providing a command to gradually reduce the transfer torque capacity produced by the second engagement device until there is a difference between the rotational speeds of the two engagement members of the second engagement device.

6. The control device according to claim 1, wherein
after the second engagement device transitions from the direct engagement state to the slipping engagement state, the torque control is terminated, and the starting control section starts a slipping rotational speed control in which the output torque of the rotary electric machine is controlled so as to bring the rotational speed of the rotary electric machine closer to the target rotational speed, which is higher than the rotational speed of the rotary electric machine for a case where the second engagement device is in the direct engagement state.

7. The control device according to claim 1, wherein
the starting control section starts a second transition control, in which the second engagement device is caused to transition from the direct engagement state to the slipping engagement state, after transfer torque information that is information indicating that the transfer torque capacity of the first engagement device has become equal to or more than a predetermined value is detected.

8. The control device according to claim 7, wherein information indicating that the rotational speed of the internal combustion engine has become equal to or more than a predetermined rotational speed is used as the transfer torque information.

9. The control device according to claim 1, wherein the rotational speed control includes:
- estimating transfer path input torque that is torque input to the power transfer path on the basis of variations in rotational speed of the rotary electric machine;
- estimating external input torque input from the wheels to the power transfer path by subtracting at least the output torque of the rotary electric machine from the transfer path input torque; and
- calculating the target rotational speed on the basis of the external input torque and vehicle required torque that is torque required to drive the wheels.

10. The control device according to claim 1, wherein the starting control section determines that the second engagement device has transitioned from the direct engagement state to the slipping engagement state when the rotational speed difference across the second engagement device has become equal to or more than a predetermined value.

* * * * *